(12) United States Patent
Izhikevich

(10) Patent No.: US 10,852,730 B2
(45) Date of Patent: Dec. 1, 2020

(54) SYSTEMS AND METHODS FOR ROBOTIC MOBILE PLATFORMS

(71) Applicant: Brain Corporation, San Diego, CA (US)

(72) Inventor: Eugene Izhikevich, San Diego, CA (US)

(73) Assignee: Brain Corporation, San Diego, CA (US)

(*) Notice: Subject to any disclaimer, the term of this patent is extended or adjusted under 35 U.S.C. 154(b) by 180 days.

(21) Appl. No.: 15/891,202

(22) Filed: Feb. 7, 2018

(65) Prior Publication Data

US 2018/0224853 A1    Aug. 9, 2018

Related U.S. Application Data

(60) Provisional application No. 62/456,254, filed on Feb. 8, 2017.

(51) Int. Cl.
*G05D 1/00* (2006.01)
*G01C 21/20* (2006.01)
(Continued)

(52) U.S. Cl.
CPC ............ *G05D 1/0088* (2013.01); *A61G 5/04* (2013.01); *G01C 21/005* (2013.01); *G01C 21/20* (2013.01);
(Continued)

(58) Field of Classification Search
CPC .. G05D 1/0088; G05D 1/0276; G05D 1/0234; G05D 1/0274; G01C 21/20; G01C 21/005; A61G 2203/22
See application file for complete search history.

(56) References Cited

U.S. PATENT DOCUMENTS

| 4,638,445 A | 1/1987 | Mattaboni |
| 4,763,276 A | 8/1988 | Perreirra et al. |

(Continued)

FOREIGN PATENT DOCUMENTS

| WO | WO-0167749 A2 | 9/2001 |
| WO | WO-2014196925 A1 | 12/2014 |
| WO | WO-2015047195 A1 | 4/2015 |

OTHER PUBLICATIONS

Damien Salle, Tecnalia-Limaccio Autonomous cleaning robot, Feb. 22, 2013, Youtube, Retrieved from the internet on Sep. 16, 2019, at <https://www.youtube.conn/watch?v=4GJ00EBbBfQ&sns=enn> (Year: 2013).*

(Continued)

*Primary Examiner* — Rami Khatib
(74) *Attorney, Agent, or Firm* — Reed Smith LLP; Sidharth Kapoor

(57) ABSTRACT

Systems and methods for robotic mobile platforms are disclosed. In one exemplary implementation, a system for enabling autonomous navigation of a mobile platform is disclosed. The system may include a memory having computer readable instructions stored thereon and at least one processor configured to execute the computer readable instructions. The execution of the computer readable instructions causes the system to: receive a first set of coordinates corresponding to a first location of a user; determine a different second location for the mobile platform; navigate the mobile platform between the second location and the first location; and receive a different second set of coordinates. Methods, apparatus and computer-readable mediums are also disclosed.

30 Claims, 11 Drawing Sheets

(51) Int. Cl.
    *G05D 1/02* (2020.01)
    *G01C 21/00* (2006.01)
    *G07F 17/00* (2006.01)
    *G06Q 20/32* (2012.01)
    *A61G 5/04* (2013.01)
    *G06Q 20/14* (2012.01)

(52) U.S. Cl.
    CPC ........... *G05D 1/028* (2013.01); *G05D 1/0234* (2013.01); *G05D 1/0274* (2013.01); *G05D 1/0276* (2013.01); *G06Q 20/145* (2013.01); *G06Q 20/3224* (2013.01); *G07F 17/0057* (2013.01); *A61G 2203/14* (2013.01); *A61G 2203/18* (2013.01); *A61G 2203/22* (2013.01); *G05D 2201/0206* (2013.01)

(56) References Cited

U.S. PATENT DOCUMENTS

| | | |
|---|---|---|
| 4,852,018 A | 7/1989 | Grossberg et al. |
| 5,121,497 A | 6/1992 | Kerr et al. |
| 5,155,684 A | 10/1992 | Burke et al. |
| 5,280,179 A | 1/1994 | Pryor et al. |
| 5,341,540 A | 8/1994 | Soupert et al. |
| 5,446,356 A | 8/1995 | Kim |
| 5,602,761 A | 2/1997 | Spoerre et al. |
| 5,612,883 A | 3/1997 | Shaffer et al. |
| 5,673,367 A | 9/1997 | Buckley |
| 5,719,480 A | 2/1998 | Bock et al. |
| 5,841,959 A | 11/1998 | Guiremand |
| 5,994,864 A | 11/1999 | Inoue et al. |
| 6,124,694 A | 9/2000 | Bancroft et al. |
| 6,169,981 B1 | 1/2001 | Werbos |
| 6,243,622 B1 | 6/2001 | Yim et al. |
| 6,366,293 B1 | 4/2002 | Hamilton et al. |
| 6,442,451 B1 | 8/2002 | Lapham |
| 6,560,511 B1 | 5/2003 | Yokoo et al. |
| 6,584,375 B2 | 6/2003 | Bancroft et al. |
| 6,636,781 B1 | 10/2003 | Shen et al. |
| 6,697,711 B2 | 2/2004 | Yokono et al. |
| 6,760,645 B2 | 7/2004 | Kaplan et al. |
| 6,812,846 B2 | 11/2004 | Gutta, Sr. et al. |
| 6,842,692 B2 * | 1/2005 | Fehr ...... G01C 21/20 701/23 |
| 6,961,060 B1 | 11/2005 | Mochizuki et al. |
| 7,002,585 B1 | 2/2006 | Watanabe et al. |
| 7,148,644 B2 | 12/2006 | Yourlo et al. |
| 7,212,651 B2 | 5/2007 | Viola et al. |
| 7,243,334 B1 | 7/2007 | Berger et al. |
| 7,342,589 B2 | 3/2008 | Miserocchi |
| 7,576,639 B2 | 8/2009 | Boyles et al. |
| 7,668,605 B2 | 2/2010 | Braun et al. |
| 8,145,492 B2 | 3/2012 | Fujita |
| 8,174,568 B2 | 5/2012 | Samarasekera et al. |
| 8,364,314 B2 | 1/2013 | Abdallah et al. |
| 8,380,348 B2 | 2/2013 | Neki et al. |
| 8,380,652 B1 | 2/2013 | Francis, Jr. |
| 8,419,804 B2 | 4/2013 | Herr et al. |
| 8,423,225 B2 | 4/2013 | Hillman, Jr. et al. |
| 8,452,448 B2 | 5/2013 | Pack et al. |
| 8,514,236 B2 | 8/2013 | Wang et al. |
| 8,515,162 B2 | 8/2013 | Cheng |
| 8,639,035 B2 | 1/2014 | Shiba |
| 8,639,644 B1 | 1/2014 | Hickman et al. |
| 8,679,260 B2 | 3/2014 | Hillman, Jr. et al. |
| 8,774,970 B2 | 7/2014 | Knopow et al. |
| 8,793,205 B1 | 7/2014 | Fisher et al. |
| 8,843,244 B2 | 9/2014 | Phillips et al. |
| 8,924,021 B2 | 12/2014 | Dariush et al. |
| 8,958,911 B2 | 2/2015 | Wong et al. |
| 8,958,912 B2 | 2/2015 | Blumberg et al. |
| 8,958,937 B2 | 2/2015 | Hillman, Jr. et al. |
| 9,008,840 B1 | 4/2015 | Ponulak et al. |
| 9,015,093 B1 | 4/2015 | Commons |
| 9,144,907 B2 | 9/2015 | Summer et al. |
| 9,192,869 B2 | 11/2015 | Moriya |
| 9,205,828 B1 * | 12/2015 | Lombrozo ...... B60W 40/105 |
| 9,242,372 B2 | 1/2016 | Laurent et al. |
| 9,298,183 B2 | 3/2016 | Artés et al. |
| 9,315,192 B1 | 4/2016 | Zhu et al. |
| 9,412,280 B1 * | 8/2016 | Zwillinger ...... G08G 5/025 |
| 9,463,794 B1 * | 10/2016 | Silver ...... G01C 21/26 |
| 9,724,829 B2 * | 8/2017 | Hyde ...... A61G 5/047 |
| 9,746,339 B2 | 8/2017 | Mattila et al. |
| 9,775,681 B2 | 10/2017 | Quaid et al. |
| 2002/0107649 A1 | 8/2002 | Takiguchi et al. |
| 2002/0158599 A1 | 10/2002 | Fujita et al. |
| 2002/0175894 A1 | 11/2002 | Grillo |
| 2002/0198854 A1 | 12/2002 | Berenji et al. |
| 2003/0023347 A1 | 1/2003 | Konno et al. |
| 2003/0025082 A1 | 2/2003 | Brewington et al. |
| 2003/0108415 A1 | 6/2003 | Hosek et al. |
| 2003/0144764 A1 | 7/2003 | Yokono et al. |
| 2003/0220714 A1 | 11/2003 | Nakamura et al. |
| 2004/0030449 A1 | 2/2004 | Solomon |
| 2004/0036437 A1 | 2/2004 | Ito |
| 2004/0051493 A1 | 3/2004 | Furuta et al. |
| 2004/0167641 A1 | 8/2004 | Kawai et al. |
| 2004/0172166 A1 | 9/2004 | Lapstun et al. |
| 2004/0172168 A1 | 9/2004 | Watanabe et al. |
| 2004/0258307 A1 | 12/2004 | Viola et al. |
| 2004/0267404 A1 | 12/2004 | Danko |
| 2005/0008227 A1 | 1/2005 | Duan et al. |
| 2005/0065651 A1 | 3/2005 | Ayers et al. |
| 2005/0069207 A1 | 3/2005 | Zakrzewski et al. |
| 2005/0125099 A1 | 6/2005 | Mikami et al. |
| 2006/0187017 A1 | 8/2006 | Kulesz et al. |
| 2006/0207419 A1 | 9/2006 | Okazaki et al. |
| 2006/0250101 A1 | 11/2006 | Khatib et al. |
| 2007/0074177 A1 | 3/2007 | Kurita et al. |
| 2007/0151389 A1 | 7/2007 | Prisco et al. |
| 2007/0200525 A1 | 8/2007 | Kanaoka |
| 2007/0229238 A1 | 10/2007 | Boyles et al. |
| 2007/0229522 A1 | 10/2007 | Wang et al. |
| 2007/0255454 A1 | 11/2007 | Dariush et al. |
| 2007/0260356 A1 | 11/2007 | Kock et al. |
| 2008/0040040 A1 | 2/2008 | Goto et al. |
| 2008/0059015 A1 | 3/2008 | Whittaker et al. |
| 2008/0097644 A1 | 4/2008 | Kaznov et al. |
| 2008/0112596 A1 | 5/2008 | Rhoads et al. |
| 2008/0140257 A1 | 6/2008 | Sato et al. |
| 2008/0300777 A1 * | 12/2008 | Fehr ...... G01C 21/20 701/532 |
| 2008/0319929 A1 | 12/2008 | Kaplan et al. |
| 2009/0037033 A1 * | 2/2009 | Phillips ...... G05D 1/0278 701/2 |
| 2009/0228166 A1 * | 9/2009 | Durkos ...... G05D 1/0219 701/26 |
| 2009/0231359 A1 | 9/2009 | Bass, II et al. |
| 2009/0234501 A1 | 9/2009 | Ishizaki |
| 2009/0265036 A1 | 10/2009 | Jamieson et al. |
| 2009/0272585 A1 | 11/2009 | Nagasaka |
| 2010/0114372 A1 | 5/2010 | Knuth, Jr. et al. |
| 2010/0152896 A1 | 6/2010 | Komatsu et al. |
| 2010/0152899 A1 | 6/2010 | Chang et al. |
| 2010/0228264 A1 | 9/2010 | Robinson et al. |
| 2010/0286824 A1 | 11/2010 | Solomon |
| 2010/0305758 A1 | 12/2010 | Nishi et al. |
| 2010/0312730 A1 | 12/2010 | Weng et al. |
| 2011/0026770 A1 | 2/2011 | Brookshire |
| 2011/0035188 A1 | 2/2011 | Martinez-Heras et al. |
| 2011/0060460 A1 | 3/2011 | Oga et al. |
| 2011/0067479 A1 | 3/2011 | Davis et al. |
| 2011/0125323 A1 * | 5/2011 | Gutmann ...... G05D 1/0274 700/258 |
| 2011/0144802 A1 | 6/2011 | Jang |
| 2011/0158476 A1 | 6/2011 | Fahn et al. |
| 2011/0160906 A1 | 6/2011 | Orita et al. |
| 2011/0160907 A1 | 6/2011 | Orita |
| 2011/0196199 A1 | 8/2011 | Donhowe et al. |
| 2011/0208745 A1 * | 8/2011 | Dietsch ...... G01C 21/20 707/743 |
| 2011/0218676 A1 | 9/2011 | Okazaki |

(56) References Cited

U.S. PATENT DOCUMENTS

| | | |
|---|---|---|
| 2011/0244919 A1 | 10/2011 | Aller et al. |
| 2011/0282169 A1 | 11/2011 | Grudic et al. |
| 2011/0296944 A1 | 12/2011 | Carter et al. |
| 2012/0001787 A1 | 1/2012 | Van Dorp |
| 2012/0008838 A1 | 1/2012 | Guyon et al. |
| 2012/0017232 A1 | 1/2012 | Hoffberg et al. |
| 2012/0045068 A1 | 2/2012 | Kim et al. |
| 2012/0072166 A1 | 3/2012 | Keal et al. |
| 2012/0079670 A1 | 4/2012 | Yoon et al. |
| 2012/0109150 A1 | 5/2012 | Quaid et al. |
| 2012/0143495 A1 | 6/2012 | Dantu |
| 2012/0144242 A1 | 6/2012 | Vichare et al. |
| 2012/0150777 A1 | 6/2012 | Setoguchi et al. |
| 2012/0209432 A1* | 8/2012 | Fleischer ............... G05B 15/02 700/259 |
| 2012/0221147 A1 | 8/2012 | Goldberg et al. |
| 2012/0303091 A1 | 11/2012 | Izhikevich |
| 2012/0303160 A1 | 11/2012 | Ziegler et al. |
| 2012/0308076 A1 | 12/2012 | Piekniewski et al. |
| 2012/0308136 A1 | 12/2012 | Izhikevich et al. |
| 2013/0000480 A1 | 1/2013 | Komatsu et al. |
| 2013/0044139 A1 | 2/2013 | Hernandez Esteban |
| 2013/0066468 A1 | 3/2013 | Choi et al. |
| 2013/0096719 A1 | 4/2013 | Sanders et al. |
| 2013/0116827 A1 | 5/2013 | Inazumi |
| 2013/0173060 A1 | 7/2013 | Yoo et al. |
| 2013/0206170 A1* | 8/2013 | Svendsen ............ G05D 1/0227 134/6 |
| 2013/0218339 A1 | 8/2013 | Maisonnier et al. |
| 2013/0245829 A1 | 9/2013 | Ohta et al. |
| 2013/0274924 A1 | 10/2013 | Chung et al. |
| 2013/0310979 A1 | 11/2013 | Herr et al. |
| 2013/0325244 A1* | 12/2013 | Wang ..................... B25J 9/1689 701/26 |
| 2013/0325325 A1 | 12/2013 | Djugash |
| 2013/0325775 A1 | 12/2013 | Sinyavskiy et al. |
| 2013/0332065 A1 | 12/2013 | Hakim et al. |
| 2013/0346347 A1 | 12/2013 | Patterson et al. |
| 2014/0002843 A1 | 1/2014 | Miyamoto et al. |
| 2014/0016858 A1 | 1/2014 | Richert |
| 2014/0081895 A1 | 3/2014 | Coenen et al. |
| 2014/0089232 A1 | 3/2014 | Buibas et al. |
| 2014/0114479 A1 | 4/2014 | Okazaki |
| 2014/0187519 A1 | 7/2014 | Cooke et al. |
| 2014/0190514 A1 | 7/2014 | Lamon et al. |
| 2014/0276951 A1 | 9/2014 | Hourtash et al. |
| 2014/0277718 A1 | 9/2014 | Izhikevich et al. |
| 2014/0350723 A1 | 11/2014 | Prieto et al. |
| 2014/0358828 A1 | 12/2014 | Phillipps et al. |
| 2014/0371907 A1 | 12/2014 | Passot et al. |
| 2014/0371912 A1 | 12/2014 | Passot et al. |
| 2015/0032258 A1 | 1/2015 | Passot et al. |
| 2015/0094850 A1 | 4/2015 | Passot et al. |
| 2015/0094852 A1 | 4/2015 | Laurent et al. |
| 2015/0120128 A1 | 4/2015 | Rosenstein et al. |
| 2015/0127155 A1 | 5/2015 | Passot et al. |
| 2015/0185027 A1 | 7/2015 | Kikkeri et al. |
| 2015/0199458 A1 | 7/2015 | Bacon et al. |
| 2015/0204559 A1 | 7/2015 | Hoffberg et al. |
| 2015/0205299 A1 | 7/2015 | Schnittman et al. |
| 2015/0213299 A1 | 7/2015 | Solano Ferrández et al. |
| 2015/0234387 A1 | 8/2015 | Mullan et al. |
| 2015/0261223 A1 | 9/2015 | Fong et al. |
| 2015/0283703 A1 | 10/2015 | Izhikevich et al. |
| 2015/0306761 A1 | 10/2015 | O'Connor et al. |
| 2015/0317357 A1 | 11/2015 | Harmsen et al. |
| 2015/0321350 A1 | 11/2015 | Mian et al. |
| 2015/0323197 A1 | 11/2015 | Burdett et al. |
| 2015/0338849 A1* | 11/2015 | Nemec ............... B62D 15/0285 701/25 |
| 2015/0339589 A1 | 11/2015 | Fisher |
| 2015/0350614 A1* | 12/2015 | Meier ................... G06K 9/0063 348/144 |
| 2015/0362921 A1 | 12/2015 | Hanaoka et al. |
| 2016/0052139 A1* | 2/2016 | Hyde ..................... B25J 11/009 701/24 |
| 2016/0057925 A1 | 3/2016 | Letsky |
| 2016/0065909 A1 | 3/2016 | Derenne et al. |
| 2016/0075026 A1 | 3/2016 | Sisbot et al. |
| 2016/0078303 A1 | 3/2016 | Samarasekera et al. |
| 2016/0121487 A1 | 5/2016 | Mohan et al. |
| 2016/0165795 A1* | 6/2016 | Balutis ................. G05D 1/0088 701/25 |
| 2016/0178382 A1* | 6/2016 | Kojo .................... G05D 1/0255 701/25 |
| 2016/0182502 A1 | 6/2016 | Smith et al. |
| 2016/0209845 A1* | 7/2016 | Kojo .................... G05D 1/0088 |
| 2016/0231746 A1* | 8/2016 | Hazelton ............... B60W 30/00 |
| 2016/0255969 A1* | 9/2016 | High .................... G05D 1/0016 |
| 2016/0265919 A1* | 9/2016 | Schuller ................ G01S 5/16 |
| 2016/0282862 A1 | 9/2016 | Duffley et al. |
| 2016/0287044 A1 | 10/2016 | Tanaka et al. |
| 2016/0309973 A1 | 10/2016 | Sheikh et al. |
| 2016/0320193 A1* | 11/2016 | Tuukkanen ........ G01C 21/3461 |
| 2016/0375592 A1 | 12/2016 | Szatmary et al. |
| 2017/0008490 A1* | 1/2017 | Sako ...................... B60R 25/25 |
| 2017/0008515 A1* | 1/2017 | Seo ....................... B60W 10/18 |
| 2017/0011340 A1* | 1/2017 | Gabbai ............... G06Q 10/0836 |
| 2017/0031361 A1* | 2/2017 | Olson ................. G06K 9/00791 |
| 2017/0139551 A1 | 5/2017 | Lupcho, III et al. |
| 2017/0266069 A1* | 9/2017 | Lozano ..................... A61G 5/04 |
| 2017/0329333 A1 | 11/2017 | Passot et al. |
| 2017/0329347 A1 | 11/2017 | Passot et al. |
| 2018/0224853 A1* | 8/2018 | Izhikevich ........... G05D 1/0274 |

OTHER PUBLICATIONS

Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet:http://msc.berkeley.edu/wjchen/publications/DSC12.sub.--8726.sub.--FI-.pdf<http: />.

Bouganis, Alexandros, et al.,"Training a Spiking Neural Network to Control a 4-DoF Robotic Arm based on Spike Timing-Dependent Plasticity", Proceedings of WCCI 2010 IEEE World Congress on Computational Intelligence, COB, Barcelona, Spain, Jul. 18-23, 2010, pp. 4104-4111.

Brown, et al., Detecting Problems in Buildings Using Infrared Cameras, Fluke Digital Library, retrieved on Jun. 8, 2015 from the Web address: www.fluke.com/library.

Camera Calibration with OpenCV tutorial, accessed Jun. 20, 2016 from the following Web address http://docs.opencv.org/2.4/doc/tutorials/calib3d/camera_calibration/camera_calibration.html.

Coupard, Pierre-Philippe, An Availabot-like computer-controlled push puppet for Linux, https://web.archive.org/web/20081106161941/http://myspace.voo.be/pcoupard/push_puppet_to _y/, 2008.

"Detection of ArUco Markers" accessed Jun. 20, 2016, available at the following Web address:http://docs.opencv.org/3.1.0/d5/dae/tutorial_aruco_detection.html#gsc.tab=0.

Hardware and Software Platform for Mobile Manipulation R&D, 2012, https://web.archive.org/web/20120128031010/http://www.willowgarage.com/pages/pr2/design.

Heikkila J., et al., "A Four-Step Camera Calibration Procedure with Implicit Image Correction," Computer Vision and Pattern Recognition, 1997, Proceedings, 1997 IEEE Computer Society Conference on, San Juan, 1997, pp. 1106-1112.

Hopkins, Chasing Water with Thermal Imaging, Infrared Training Center, 2011.

Hunt, et al., "Detection of Changes in Leaf Water Content Using Near-and Middle-Infrared Reflectance," Journal of Remote Sensing of Environment, 1989, vol. 30 (1), pp. 43-54.

Jain, Learning Trajectory Preferences for Manipulators via Iterative Improvement, 2013, Advances in Neural Information Processing Systems 26 (NIPS 2013).

Joshi, Blog Post from Perpetual Enigma Website, "Understanding Camera Calibration" posted May 31, 2014, accessed Jun. 20, 2016

(56) References Cited

OTHER PUBLICATIONS at the following Web address: https://prateekvjoshi.com/2014/05/31/understanding-camera-calibration/.
"Kalman Filter" Wikipedia page, accessed Mar. 2, 2016, https://en.wikipedia.org/wiki/Kalman_filter.
Kasabov, "Evolving Spiking Neural Networks for Spatio-and Spectro-Temporal Pattern Recognition", IEEE 6th International Conference Intelligent Systems 2012 [Retrieved on Jun. 24, 2014], Retrieved from the Internet: http://ncs.ethz.ch/projects/evospike/publications/evolving-spiking-neural-networks-for-spatio-and-spectro-temporal-pattern-recognition-plenary-talk-ieee-is/view.
Maesen, et al., "Tile Tracker: A Practical and Inexpensive Positioning System for Mobile AR Applications" pp. 1-8.
"Pose (Computer Vision)" Wikipedia page accessed Jun. 20, 2016, available at https://en.wikipedia.org/wiki/Pose_(computer_vision).
PR2 User Manual, Oct. 5, 2012.
Rahman, et al., "An Image Based Approach to Compute Object Distance, "International Journal of Computational Intelligence Systems, 2008, vol. 1 (4), pp. 304-315.
Rosebrock,Tutorial "Find Distance from Camera to Object/marker using Python and OpenCV" Jan. 19, 2015, accessed Jun. 20, 2016 at the following Web address:http://www.pyimagesearch.com/2015/01/19/find-distance-camera-objectmarker-using-python-opencv/.
Rosenhahn, et al., Pose Estimation in Conformal Geometric Algebra Part I: The Stratification of Mathematical Spaces, Journal of Mathematical Imagine and Vision 22:27-48, 2005.

Steele, The Human Touch Makes Robots Defter, Nov. 6, 2013, Cornell Chronicle. http://www.news.cornell.edu/stories/2013/11/human-touch-makes-robots-defter.
Thermal Imaging for Moisture and Restoration, retrieved on Apr. 5, 2016 from the following Web address: www.flir.com/home.
Torralba, et al., "Depth Estimation from Image Structure, " Journal of IEEE Transactions on Pattern Analysis and Machine Intelligence, 2002, vol. 24 (9), pp. 1226-1238.
Triggs, "Camera Pose and Calibration from 4 or 5 known 3D Points," 7th International Conference on Computer Vision (ICCV '99), IEEE Computer Society, 1999, vol. 1, pp. 278-284.
UNCC Machine Lab Wiki Documentation "ROS and Camera Calibration" accessed Jun. 20, 2016 at the following Web address: http://visionlab.uncc.edu/dokuwiki/ros_and_camera_calibration#aruco_-_augmented_reality_library_from_the_university_of_cordoba.
Video "TECNALIA-Limaccio Autonomous Cleaning Robot", published Feb. 22, 2013, available at the following Web address: http://www.youtube.com/watch?v=4GJ00EBbBfQ&sns=em.
Wan, et al., "Automatic Navigation System with Multiple Sensors," IFIP International Federation for Information Processing, vol. 259, Computer and Computing Technologies in Agriculture, 2008, vol. 2, pp. 769-776.
Zhang, A Flexible New Technique for Camera Calibration, last updated Dec. 5, 2009, Technical Report MSR-TR-98-71, Dec. 2, 1998.

* cited by examiner

SYSTEMS AND METHODS FOR ROBOTIC MOBILE PLATFORMS

PRIORITY

This application claims the benefit of priority to U.S. Provisional Patent Application Ser. No. 62/456,254 filed Feb. 8, 2017, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for robotic mobile platforms.

Background

Currently, mobile platforms can be used to transport items, people, animals, cargo, freight, and/or things from one location to another. These mobile platforms can operate using motors, rails, electricity, and/or movement causing systems. In some cases, the mobile platforms can be mechanical and/or manual, such as those moved by humans (e.g., wheelchairs, bikes, row boats, etc.) Typically, such mobile platforms require user operation in order to steer, drive, and/or move the mobile platforms.

Wheelchairs are one example of a mobile platform. Conventional wheelchairs come in a number of forms. Manual wheelchairs are often self-propelled, being pushed by an occupant or others. In some cases, wheelchairs can be powered, using propulsion by batteries and/or electric motors. However, in some cases, operation by an occupant of a wheelchair, whether by manual operation or using a powered wheelchair, can be difficult due to, e.g., disability and/or injury and/or unwillingness on the part of the occupant. Accordingly, in some cases, another person can assist someone using a wheelchair.

In general, use of mobile platforms can require use of operators beyond just the occupants who are using the mobile platforms for transportation. As a result, mobile platforms can be costly to operate from a time and labor perspective. Moreover, even when occupants can control the mobile platforms, such control can be taxing. Accordingly, there is a need in the art for improved systems and methods for mobile platforms.

SUMMARY

The foregoing needs are satisfied by the present disclosure, which provides for, inter alia, systems and methods for robotic mobile platforms. In some implementations, the robotic mobile platform can comprise a robotic wheelchair. The robotic wheelchair can be configured to pick up passengers and deliver the passengers to destinations.

Example implementations described herein have innovative features, no single one of which is indispensable or solely responsible for their desirable attributes. Without limiting the scope of the claims, some of the advantageous features will now be summarized.

In one aspect, a method for manufacturing a robot is disclosed. In one exemplary implementation, the method includes: obtaining a wheelchair; attaching a robotics module comprising one or more sensors and one or more controllers to the wheelchair; and loading autonomy features on the robotics module to enable autonomous navigation of the wheelchair.

In one variant, the method further comprises: determining if the wheelchair has an actuator for moving operated at least in part by a controller; and if the wheel chair does not have either the actuator or controller, installing such actuator or controller.

In another aspect, a robotic mobile platform is disclosed. In one exemplary implementation, the robotic mobile platform includes: a chair component configured to seat a passenger; one or more sensors configured to generate sensor data about an environment; one or more actuators configured to move the robotic mobile platform from one location to another; a user interface configured to display and receive information; and a processor configured to: read a maker associated with a starting location using the one or more sensors, receive a passenger in the chair component, receive a destination through the user interface, and cause the one or more actuators to move the robotic mobile platform from the marker to the destination.

In one variant, the robotic mobile platform further comprises a communications unit configured to receive a signal indicative at least in part of the location of the marker, wherein the one or more actuators move the robotic mobile platform to the marker based at least in part on the signal. In another variant, the robotic mobile platform comprises a wheelchair.

In another variant, the processor is further configured to detect a person in the sensor data. In another variant, the processor is further configured to adapt the movement of the robotic mobile platform based at least in part on the detection of the person.

In yet another aspect, a method of moving a person with a robotic wheelchair is disclosed. In one exemplary implementation, the method includes: going to a location to pick up a person; receiving the person as a wheelchair occupant; receiving instructions for a destination; and travelling to the destination.

In one variant, the method includes receiving a signal indicative in part of a pick-up location. In another variant, the receiving destination instructions include receiving a selection of the destination.

In yet another aspect, a robotic system is disclosed. In one exemplary implementation, the robotic system includes: a plurality of robots; one or more access point; a network communicatively coupled to the plurality of robots and the one or more access points, the network configured to: receive information from the one or more access points relating to a passenger pick-up location for a first robot of the plurality of robots, cause the first robot to move to the pick-up location, and coordinate the movement of others of the plurality of robots to account for the movement of the first robot.

In one variant, the one or more access points includes at least one of a console and an electronic device. In another variant, the first robot and a second robot of the plurality of robots operate in tandem, wherein the first robot and second robot travel together.

In yet another aspect, a non-transitory computer-readable storage medium is disclosed. In one exemplary implementation, the non-transitory computer-readable storage medium has a plurality of instructions stored thereon, the instructions being executable by a processing apparatus to operate a robot. In one exemplary implementation, the instructions are configured to, when executed by the processing apparatus, cause the processing apparatus to: go to a location to pick up a person; receive the person as a wheelchair occupant; receive destination instructions; and travel to the destination.

In one variant, the instructions further cause the processing apparatus to receive a signal indicative in part of a pick-up location. In another variant, receiving destination instructions includes receiving a selection of the destination.

In another exemplary implementation, the non-transitory computer-readable storage medium has a plurality of instructions stored thereon, the instructions being executable by a processing apparatus to: receive coordinates for a first set of coordinates corresponding to a first location for a passenger; determine a different second location for the first mobile platform; navigate the first mobile platform between the second location and the first location; and receive destination coordinates for the passenger.

In one variant, the at least one processor is further configured to execute the computer readable instructions to: transmit information corresponding to coordinates of the first mobile platform to at least one processor on a second mobile platform.

In another variant, the at least one processor on the first mobile platform is further configured to execute the computer readable instructions to: receive information from one or more sensors, the received information configured to navigate the first mobile platform along a first path.

In yet another variant, the at least one processor on the first mobile platform is further configured to execute the computer readable instructions to: alter the first path of navigation for the first mobile platform in response to the received information from the one or more sensors.

In yet another variant, the received information from the one or more sensors is in relation to the passenger of the mobile platform; and the at least one processor on the first mobile platform is further configured to execute the computer readable instructions to output a command based on the alteration of the first path, the command corresponds to a halt movement of the first mobile platform.

In yet another variant, the received information from the one or more sensors is based on one or more objects in an environment of the first mobile platform, and the at least one processor on the first mobile platform is further configured to execute the computer readable instructions to output a command based on the alteration of the first path, the path corresponds to avoiding a collision with the one or more objects.

In yet another aspect, a system for enabling autonomous navigation of a mobile platform is disclosed. In one exemplary implementation, the system includes a memory having computer readable instructions stored thereon and at least one processor configured to execute the computer readable instructions to: receive a first set of coordinates corresponding to a first location of a user; determine a different second location for the mobile platform; navigate the mobile platform between the second location and the first location; and receive a different second set of coordinates.

In one variant, the receipt of the different second set of coordinates is after the navigation.

In another variant, the at least one processor is further configured to execute the computer readable instructions to: transmit one or more commands to one or more actuators on the mobile platform, the one or more commands configured to enable the navigation of the mobile platform.

In yet another variant, the at least one processor is further configured to execute the computer readable instructions to: receive a mode selection command, the mode selection command configured to enable at least one of a first mode and a different second mode for the mobile platform, the first mode corresponding to a powered-manual mode, and the second mode corresponding to an autonomous mode.

In yet another variant, the at least one processor is further configured to execute the computer readable instructions to: receive data from one or more sensors, the data corresponds to time of arrival of the mobile platform at the first set of coordinates.

In yet another variant, the data is based on visual identification of a marker within an environment of the mobile platform.

In yet another variant, the data is based on radio identification of a marker within an environment of the mobile platform.

In yet another variant, the at least one processor is further configured to execute the computer readable instructions to: cause display of a plurality of locations on a display device, the plurality of locations including the second set of coordinates for the user.

In yet another aspect, a method for enabling autonomous navigation of a mobile platform is disclosed. In one exemplary implementation, the method includes receiving a first set of coordinates corresponding to a first location of a user; determining a different second location for the mobile platform; navigating the mobile platform between the second location and the first location; and receiving a different second set of coordinates for the user.

In one variant, the receiving of the second set of coordinates for the user is prior to arriving at the first location.

In another variant, the method further includes providing one or more commands to one or more actuators on the mobile platform, the one or more commands configured to enable the navigating of the mobile platform.

In yet another variant, the method further includes receiving data from one or more sensors, the data configured to enable determination of arrival time at the first location for the user.

In yet another variant, the receiving of the data includes identifying a marker within an environment of the mobile platform.

In yet another variant, the method further includes issuing the second set of coordinates to the user; and the receiving of the second set of coordinates for the user comprises scanning the issued second set of coordinates.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1A:
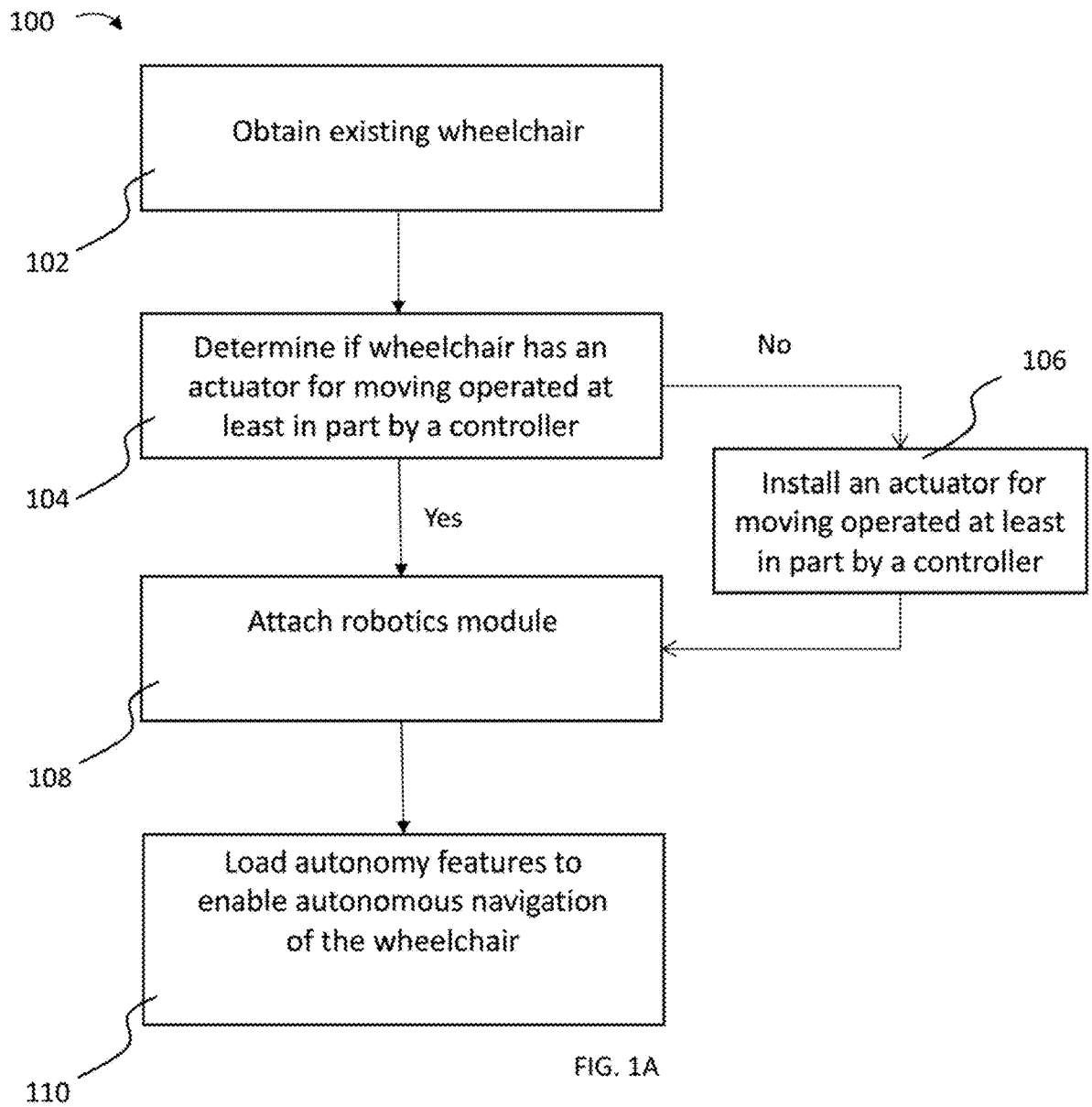
FIG. 1A is a process flow diagram of an exemplary method for manufacturing a wheelchair in accordance with some implementations of this disclosure.

All Figures disclosed herein are © Copyright 2018 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus can be implemented or a method can be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein can be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved mobile platforms. In particular, some implementations of the present disclosure relate to robots, such as robotic mobile platforms. As used herein, a robot can include mechanical and/or virtual entities configured to carry out a complex series of actions automatically. In some cases, robots can be machines that are guided and/or instructed by computer programs and/or electronic circuitry. In some cases, robots can include electro-mechanical components that are configured for navigation, where the robot can move from one location to another. Such robots can include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots can also include any autonomous and/or semi-autonomous machine for transporting items, people, animals, cargo, freight, objects, luggage, and/or anything desirable from one location to another. In some cases, such robots used for transportation can include robotic mobile platforms as the robots are mobile systems that can navigate and/or move autonomously and/or semi-autonomously. These robotic mobile platforms can include autonomous and/or semi-autonomous wheelchairs, bikes, row boats, scooters, forklifts, trams, trains, carts, vehicles, tugs, and/or any machine used for transportation.

As referred to herein, wheelchairs can include wheelchairs that are manually controlled (e.g., driven, pushed, or remote controlled), powered (e.g., run using a motor and/or actuators), and/or autonomous (e.g., using little to no direct user control). For example, wheelchairs can include apparatuses used by people for whom walking is difficult or impossible due to illness, injury, disability, weakness, etc. Wheelchairs can include any number of wheels and wheels of different sizes. For example, wheelchairs can have 1, 2, 3, 4, 5, 6, 7, or more wheels. In many cases, wheelchairs have a chair for which an occupant can sit. In some cases, wheelchairs can also include apparatuses commonly referred to by other names, such as chairs, power chairs, scooters, hospital beds, cruisers, spinners, carts, lift chairs, power recliners, pods, and/or any other substantially similar apparatuses.

Certain examples are described herein with reference to wheelchairs or mobile platforms, or robotic wheelchairs or robotic mobile platforms. Such examples are used for illustration only, and the principles described herein may be readily applied to robots generally.

In some cases, robots can include appliances, machines, and/or equipment automated to perform one or more tasks. For example, a module can be attached to the appliances, machines, and/or equipment to allow them to operate autonomously. In some implementations, the module can include a motor that drives the autonomous motions of the appliances, machines, and/or equipment. In some cases, the module causes the appliances, machines, and/or equipment to operate based at least in part on spoofing, such as by sending control signals to pre-existing controllers, actuators, units, and/or components of the appliances, machines, and/or equipment. The module can include sensors and/or processors to receive and generate data. The module can also include processors, actuators, and/or any of the components described herein to process the sensor data, send control signals, and/or otherwise control pre-existing controllers, units, and/or components of the appliances, machines, and/or equipment. Such appliances, machines, and/or equipment can include cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and/or any type of machine.

Detailed descriptions of the various implementations and variants of the system and methods of the disclosure are now provided. While many examples discussed herein may refer to robotic floor cleaners, it will be appreciated that the described systems and methods contained herein are applicable to any kind of robot. Myriad other example implementations or uses for the technology described herein would be readily envisaged by those having ordinary skill in the art, given the contents of the present disclosure.

Advantageously, the systems and methods of this disclosure at least: (i) allow robots to safely operate in environments; (ii) provide comfort (e.g., by humans and/or animals) with robots by allowing robots to exhibit expected behaviors; (iii) allow a process flow for robots to work in their corresponding environment; (iv) reduce resource costs, such as labor, time, and energy; and (v) improve the efficiency, cost-effectiveness, and/or time of transportation. Other advantages are readily discernable by one having ordinary skill in the art given the contents of the present disclosure.

For example, in some implementations a wheelchair is disclosed. The wheelchair can include a robotic wheelchair in that it can navigate autonomously in accordance with systems and methods of the present disclosure. Advantageously, the robotic wheelchair can allow effective navigation of the robotic wheelchair from one location to another with little to no direct operator control. In some cases, the robotic wheelchair can carry a person, such as a person who is elderly, handicapped, disabled, ill, impaired, and/or unable or unwilling to walk. The robotic wheelchair can also carry any item, animal, and/or thing desired, such as a person's pets, personal belongings, and/or other things. In some cases, such items, animals, or things desired can be in addition to or in the alternative to a person. Accordingly, an advantage of the present disclosure is the effective transportation of people, items, animals, and/or things. Moreover, such transportation can be made with reduced dependency on labor (e.g., of the occupant and/or another operator) reducing the time, energy, and/or cost of the transportation.

As another example, a robotic wheelchair in accordance to some implementations of the present disclosure can also navigate with no person, items, animals, and/or desired things aboard. Such may be desirable in positioning the robotic wheelchair. For example, a person desiring a wheelchair can be at a location away from the wheelchair. Conventional wheelchairs can require the person desiring the wheelchair to go to the location of the wheelchair or another person bring the wheelchair to the person desiring the wheelchair. However, a robotic wheelchair in accordance with some implementations of this disclosure can navigate to that person in order to allow that person to use the robotic wheelchair. Similarly, once a person has left a wheelchair, conventional wheelchairs can require someone to push the wheelchair to another location for further use, storage, service, and/or any other desired action. However, a robotic wheelchair in accordance with some implementations of this disclosure can navigate to such location with little to no direct operator control. Accordingly, an advantage of the systems and methods of the present disclosure is the efficient management of mobile platforms (e.g., wheelchairs) while reducing the labor required for such management.

As another example, certain locations where wheelchairs are used (e.g., shopping malls, hospitals, retirement communities, airports, office buildings, city centers, schools, and/or public or private places) can be heavily congested and/or chaotic. Accordingly, human navigation in such circumstances can be difficult or even impossible. By way of illustration, a human operating the wheelchair (whether as an occupant or otherwise) may need to react to avoid people, luggage, obstacles, structures, robots, displays, transport vehicles, animals, items, and/or other things in its path: some of which may be dynamically moving. In some cases, where the human operating the wheelchair is impaired and/or inattentive, collisions can occur due to the human operator. In some cases, even where the human operating the wheelchair is entirely vigilant, collisions can also occur due to limits in human perception, actions by third parties, and/or events out of the control of the human operator. Systems and methods of this disclosure advantageously enable less reliance on humans for navigation, which has the potential to reduce collisions.

Moreover, where a plurality of robotic mobile platforms (e.g., robotic wheelchairs) is used, systemic organization and order can increase, allowing for further reduction in collisions. For example, in some implementations of the present disclosure, a plurality of robotic mobile platforms (e.g., robotic wheelchairs) can detect each other, communicate, and/or be centrally controlled. Accordingly, the robotic mobile platforms can synchronize, move in coordination, and/or send/receive signals enhancing the ability of the robotic mobile platforms to avoid one another. Advantageously, such ability can reduce collisions. Moreover, such ability can improve the environment in which the robotic mobile platforms are operating, enhancing the perception of the robotic mobile platforms to humans and/or animals, making the humans and/or animals more comfortable around the robotic mobile platforms. This enhanced perception can enhance the human and/or animal experience.

As another example, systems and methods of the present disclosure can enhance the workflow in conjunction with robotic mobile platforms. Such an enhanced workflow can: instill confidence in the robotic mobile platform; allow for efficient transportation of people, items, animals, and things; and improve the usability of robotics.

As another example, systems and methods can allow for use of robotics with relatively few or no modifications to an environment. Certain contemporary solutions involving robots can require users to install rails, beacons, markers, lines, and/or cues for the robot to navigate. In some cases, such installations can be costly from a time, money, and/or aesthetic perspective. Such installations can also cost/require resources to maintain. Moreover, the installations can create failure points in robotic solutions, causing at least a portion of the solution to fail if one or more aspects of the installations do not operate as intended. Advantageously, systems and methods of this disclosure can allow robotics to rely on relatively few or no installations in some instances. Yet, in some instances, changes to the environment can be made in accordance with aspects of this disclosure in order to enhance efficiency and work flow.

FIG. 1A is a process flow diagram of an exemplary method 100 for manufacturing a wheelchair in accordance with some implementations of this disclosure. For illustrative purposes, method 100 refers to a wheelchair; however, other robots are contemplated and method 100 can be readily applied to other robots by one having ordinary skill in the art given the contents of the present disclosure.

Figure 1B:
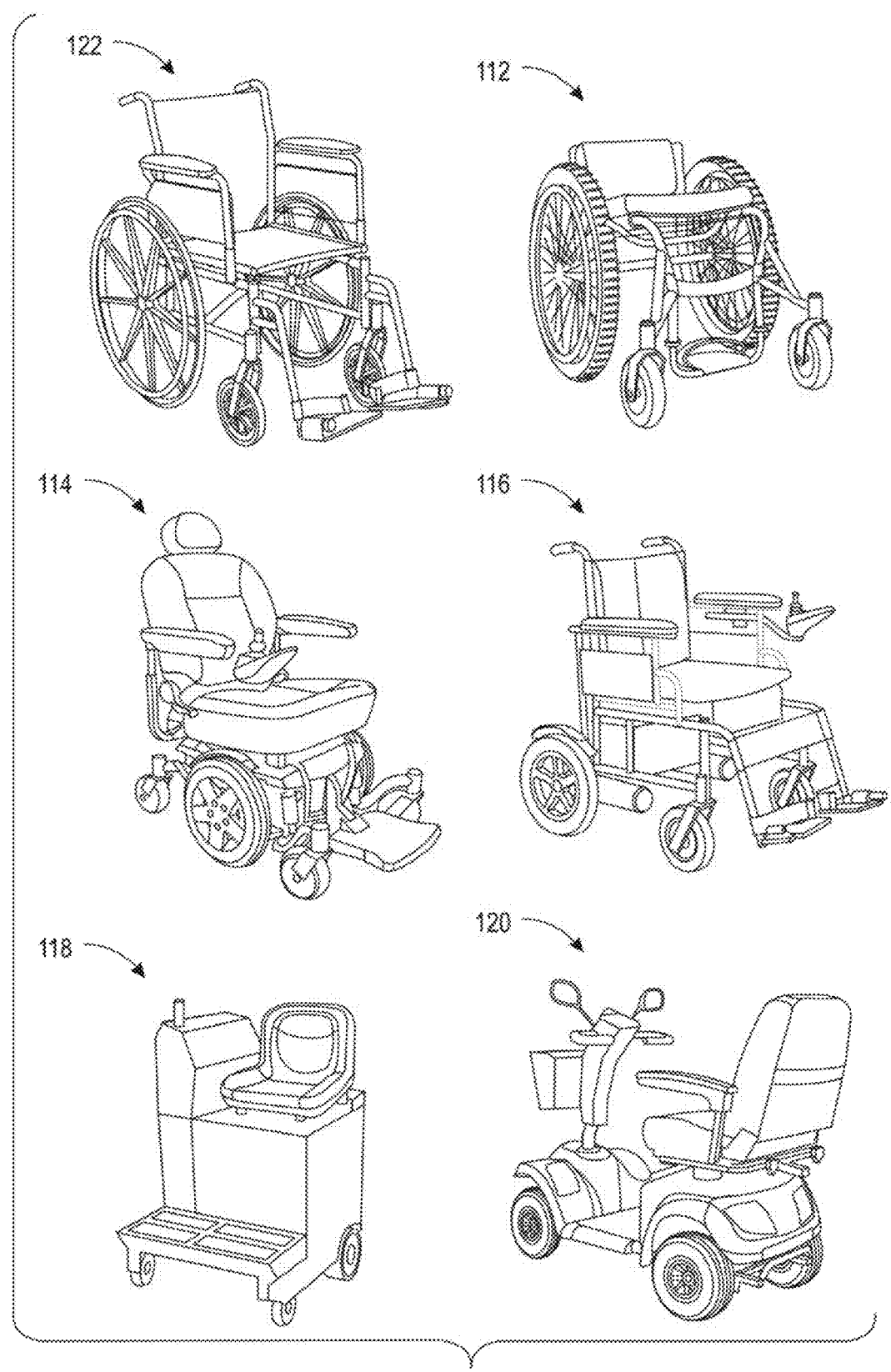
FIG. 1B are angled side views of exemplary body forms of wheelchairs in accordance with some implementations of this disclosure.

Block 102 includes obtaining an existing wheelchair. For example, the wheelchair can include any wheelchair described in this disclosure, including powered and manual wheelchairs. By way of illustration, FIG. 1B are side views of exemplary body forms of wheelchairs in accordance with some implementations of this disclosure. Body form 122 is a standard wheelchair having a seat and four wheels. Body form 122 has two large wheels and two smaller wheels. Typically, a person sitting in the seat of body form 122 would physically turn the wheels in order to make the wheelchair move. The person could turn the large wheels forward in order to cause body form 122 to move forward, or turn the large wheels backwards in order to move body form 122 backwards. Differential forces could be applied to the large wheels in order to make body form 122 turn. Body form 122 has rearward facing handles in order for a person not sitting in body form 122 to push or pull body form 122. This person not sitting in body form 122 can push or pull an empty wheelchair to move it from one location to another, or push or pull body form 122 with a person occupant in order to transport the person and wheelchair 122 from one place to another.

Body form 112 is substantially similar to body form 122. Body form 112 is illustrative of a sport and/or off-road wheelchair. The seat of body form 112 is smaller and without armrests to allow more freedom of movement for a person in body form 112.

Body form 114 is an example powered wheelchair in that it has motors that allow body form 114 to move without a person manually moving body form 114. Body form 114 has six wheels and a large seat. Body form 114 has a joystick for a person occupying body form 114 (and/or any other person) to direct movements of wheelchair 114.

Body form 116 is substantially similar to body form 122, but is also powered. Body form 116 also has a joystick for an occupant of body form 116 (and/or any other person) to direct movements of body form 116.

Body form 118 illustrates a wheelchair with a boxier shape. Body form 118 has a joystick for an occupant of body form 116 to direct movements of body form 116. It also has a seat and enlarged platform configured for an occupant to place his/her feet. Body form 118 is also a powered wheelchair.

Body form 120 is a powered wheelchair comprising a scooter. The scooter can include a larger base and a steering column. Advantageously, the scooter can have an increased footprint for more stability, speed, and support (e.g., for more items and/or weight). However, the larger footprint can also restrict where body form 120 can traverse.

In some implementations, the wheelchair may not even be a traditional wheelchair. For example, carts, ride-on floor cleaners, and/or vehicles can, or be modified to, serve substantially similar utility as a wheelchair. FIG. 1B is presented herein to give a few illustrative examples of wheelchairs, however, a person having ordinary skill in the art would appreciate that there can be any number of different body forms of a wheelchair in accordance with the contents of the present disclosure.

Returning to FIG. 1A, block 104 includes determining if the wheelchair has an actuator (and/or plurality of actuators) for movement operated at least in part by a controller (and/or a plurality of controllers). For example, wheelchairs 114, 116, 118, and 120 have motors. The motors allow the wheelchairs to move from one place to another. The motors can be substantially similar to the motors described with reference to actuators unit 220, which is described later with reference to FIG. 2C.

In some cases, the motors are controlled by a controller. The controller can provide commands to the actuators of the wheelchair. For example, the controller can send commands to actuators of the wheelchair to perform primitive or compound actions, such as those related at least in part to moving forward, moving backwards, turning, accelerating, slowing down, stopping, etc. The controller can be substantially similar to controller 204 described later with reference to FIG. 2C.

If the wheelchair does not have one or more of the actuator and/or controller (and/or the actuator(s) and/or controller(s) of the wheelchair are inadequate due to functionality, performance, location, and/or any other characteristic), block 106 includes installing an actuator (and/or a plurality of actuators) for movement operated at least in part by a controller (and/or a plurality of controllers). For example, the motor can be substantially similar to actuators of actuators unit 220 and the controller can be substantially similar to controller 204.

Block 108 includes attaching a robotics module. The robotics module can comprise one or more sensors such as, for example, sensors unit 212. The robotics module can also comprise a controller to process data from the sensor(s). The controller of the robotics module can be in communication with the controller of the wheelchair.

Block 110 includes loading autonomy features to enable autonomous navigation of the wheelchair. The autonomy features can be instantiated in, for example, firmware, source code, object code, software, etc. In some cases, certain computer logic can be instantiated in hardware, such as through logic gates, switches, wires, etc.

The autonomy features can include processing data from the sensor(s). The autonomy features can run mapping and/or localization methods in order for the robot to navigate around the environment of the robot. Moreover, the autonomy features can include sending/receiving commands, statuses, identifying information, information, and other signals to the wheelchair (e.g., a controller of the wheelchair determined and/or installed in block 104 or block 106). In this way, the robotics module can monitor the wheelchair and also control the wheelchair (e.g., through sending command signals and/or spoofing).

In some implementations, the autonomy can be loaded on the robotics module. For example, the autonomy features can be preloaded on the module prior to attachment to the wheelchair. As another example, the autonomy features can be loaded onto the robotics module after the robotics module is attached.

In some implementations, the robotic wheelchair can operate in powered-manual and/or autonomous modes. For example, in this way, a user can control the robotic wheelchair with a joystick and/or other controller when the robotic wheelchair encounters a scenario that the robotic wheelchair would have trouble navigating autonomously, runs into errors, and/or has any other issues. Moreover, a user can also use the robotic wheelchair in the powered-manual mode when he/she desires, such as when he/she gets enjoyment out of driving and/or has no particular destination in mind (e.g., wandering or moving to see, explore, entertain, etc.).

Though method 100 gives an example of attaching a robotics module to an existing wheelchair, systems and methods of this disclosure are readily applicable to robotic wheelchairs that are integrated with capabilities substantially similar to those described with respect to the robotics module. This disclosure is not limited to robots manufactured in accordance to method 100.

Figure 2A:
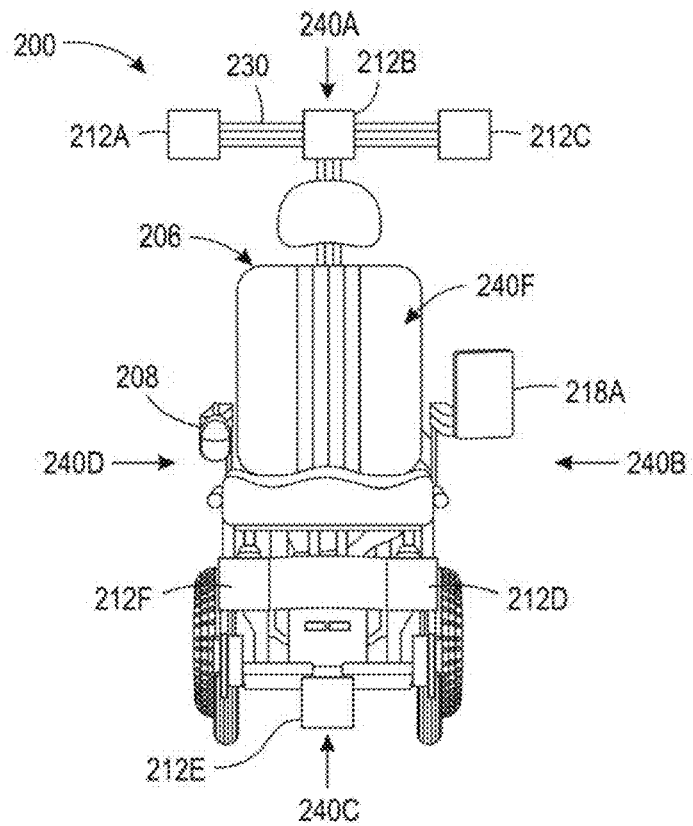
FIG. 2A is a front view of a robot comprising a robotic wheelchair in accordance with some implementations of the present disclosure.

FIG. 2A is a front view of robot 200 comprising a robotic wheelchair in accordance with some implementations of the present disclosure. Robot 200 comprises chair 206 of a wheelchair having a seat for an occupant, wheels, footrests, and other features found on wheelchairs. Robot 200 can also have a plurality of sides, such as top side 240A, left side 240B, bottom side 240C, right side 240D, front side 240F, and back side 240G (pictured in FIG. 2B). A person having ordinary skill in the art would appreciate by the contents of this disclosure that robot 200 can have other sides as well, including those corresponding to the surfaces of robot 200, which can vary by shape (e.g., rectangular, pyramidal, humanoid, or any other designed shape). By way of illustration, front side 240F can be positioned on the forward-facing side of robot 200, where the forward-facing side is forward in the direction of forward movement of robot 200. Back side 240G can be positioned on the backward-facing side of robot 200, where the backward-facing side is the side facing in substantially the opposite direction of the forward-facing side. Right side 240D can be the right-hand side relative to front side 240F, and left side 240B can be the left-hand side relative to front side 240F.

Robot 200 has control 208, allowing for control of robot 200 by an occupant and/or user. By way of illustration, control 208 can comprise a joystick, buttons, dials, touchpads, controllers, trackpads, knobs, gesture-sensing mechanism, microphones (e.g., to accept verbal commands) and/or any other control mechanism. In some cases, control 208 can be located elsewhere than as illustrated. For example, due to a disability and/or comfort, an occupant may prefer control 208 to be accessible by a particular hand, such as a right hand and/or left hand. Accordingly, control 208 can be positioned proximally to right side 240D or left side 240B of robot 200. Moreover, in some cases, a person may not be able to control robot 200 by hand, and control 208 may be accessible by a foot and/or other portion or faculty of a person occupant. Accordingly, control 208 can be located on a foot rest and/or other location. In some cases, the control could be performed by voice commands or gestures.

Robot 200 has support structure 230. Advantageously, support structure 230 can support sensor(s) and/or other components of robot 200. The support structure can comprise metal (e.g., steel, aluminum, tin, iron, and/or any construction metal), plastic (e.g., fiber-reinforced polymers, polyethylene terephthalate, high-density polyethylene, polyvinyl chloride, low density polyethylene, polypropylene, polystyrene, and/or any other plastic), polymers (e.g., polythene, polypropene, polyvinyl chloride, Teflon, polystyrene, bakelite, lexan, melamine, Perspex, vinyl rubber, neoprene, polystyrene-butadiene, and/or other polymers), ceramics (e.g., boron nitride, earthenware, porcelain, sialon, silicon carbide, steatite, titanium carbide, zirconia, and/or other ceramics), composites (e.g., cement, concrete, metal composites, ceramic composites, and/or other composites), organics (e.g., wood and/or other organics), and/or any other material. In some implementations, support structure 230 can be encased, such as in a box, chassis, and/or housing.

For example, support structure 230 can extend distally from chair 206. As illustrated, support structure extends above chair 206. For example, chair 206 can have a vertical axis indicative at least in part of the vertical plane of chair 206. Support structure 200 can comprise a first beam aligned axially to the vertical axis of the vertical plane of chair 206. This vertical beam can allow for one or more sensors to extend vertically from chair, such that the sensors can be located above an occupant sitting in chair 206. Advantageously, having a location above the occupant can allow the sensor to have a field of view that is not entirely obstructed by a person sitting in chair 206 and/or by any other component of robot 200. In some implementations, there can be a plurality of such vertically extending beams, extending axially distally from robot 200, thereby having the ability to support a plurality of sensors. In some implementations, vertically extending components of support structure 230 can be set at an angle to the vertical axis in order to allow desired placement of a sensor. The angle can be determined based at least in part on the desired location of a sensor, the point of connection of support structure 230 to chair 206, the strength of the material of support structure 230, the placement of other portions of support structure 230 (e.g., cross beams, sensors, etc.), durability of support structure 230, weight of other portions of support structure 230, and/or other structural considerations. For example, a beam can extend from the side of chair 206, thereby also giving an un-obstructed view.

Figure 2B:
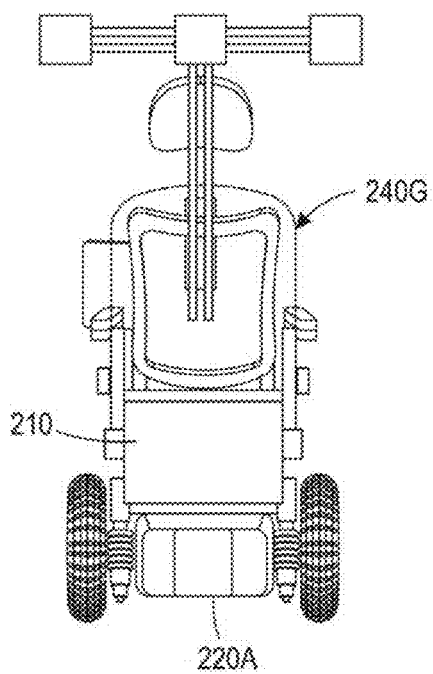
FIG. 2B is a back view of a robot comprising a robotic wheelchair in accordance with some implementations of the present disclosure.

In some implementations, one or more of vertically extending beams can have one or more cross beams, such as illustrated in FIGS. 2A and 2B. One or more cross beams can extend in one or more directions, at one or more angles. For example, a cross beam can extend in one direction, forming an "L". As another example, a cross beam can extend in two directions forming a "T" shape, and so on and so forth. As another example, the cross beams can extend perpendicularly to the axis of a beam vertically extending beam from chair 206. As another example, the cross beams can extend at acute or obtuse angles, forming other shapes, including symmetric and asymmetric shapes.

Sensors 212A-212F can be dispersed throughout robot 200. One or more of sensors 212A-212F can be at least a portion of sensors unit 212 (described later with reference to FIG. 2C). For example, sensors 212C and 212F can comprise proprioceptive sensors (as will be described later with reference to sensors unit 212 in FIG. 2C) such as odometers. Sensors 212A-212C and 212E can comprise exteroceptive sensors configured to sense the environment of robot 200 (as will be described later with reference to sensors unit 212 in FIG. 2C). In some implementations, one or more of sensors 212A-212F can be positioned so that the field of view of that sensor covers the area desired. For example, where 212B is a slanted LIDAR, it can be angled downwards (e.g., a 30, 45, 60, or any other angle) to cover an area extending in front of robot 200. As another example, sensor 212E can be a planar LIDAR, positioned at a distance from the ground on a horizontal axis in order to detect objects (e.g., items, people, animals, obstacles, etc.) in front and/or behind robot

200. Accordingly, sensors can be positioned at desired angles relative to robot 200 and/or support structure 230.

User interface 218A can be positioned on robot 200 to allow user interaction with robot 200. For example, user interface 218A can be used for a user to input a route, send/receive information, view statuses, control robot 200 (e.g., speed, reverse, acceleration, turning, etc.), configure robot 200, calibrate robot 200 (e.g., sensors of robot 200), drive robot 200, send/or receive communications, adjust aspects of robot 200 (e.g., motorized adjustments of seat levels, arm rest levels, foot rest levels, wheel angles, etc.), and/or perform any interaction with robot 200. User interface 218A can be at least a portion of user interface unit 218.

FIG. 2B is a back view of robot 200 comprising a robotic wheelchair in accordance to some implementations of the present disclosure. Robot 200 can have unit 210, which can house additional components of robot 200, such as components of a robotics module. For example, unit 210 can house a controller configured to process data from sensors 212A-212F, user interface 218A, motor 226, and/or components of robot 200. For example, unit 210 can comprise one or more components described with reference to FIG. 2C. Actuator 220A can include actuators for moving robot 200, such as an electric motor for moving the wheels of robot 200. Actuator 220A can be an actuator of actuators unit 220 described with reference to FIG. 2C.

Though FIGS. 2A and 2B illustrate one particular body form, others are contemplated. For example, robot 200 can include pods, enclosures, and/or covers for an occupant. Moreover, chair 206 can be positioned at different angles, such as at an angle to make a person standing, sitting, or anywhere between standing or sitting. In this way, robot 200 can have a narrower depth, but allow robot 200 to transport a person. In some cases, chair 206 can be positioned to incline a person. Such may be the case for someone who is disabled, injured, and/or cannot (or does not want to) sit or stand.

Moreover, in some implementations, robotic components can be fully integrated into the body of robot 200 (e.g., into chair 206). By way of illustration, sensors 212A-212F can be positioned inside chair 206, such as in the head rest, backing, seat, arm rests, leg rests, wheels, etc. Advantageously, this can provide a more integrated appearance. However, such integration can increase the cost of the unit and/or risk persons blocking the sensor.

In some cases, a structure can be positioned at the front of robot 200, such as a bumper and/or column. The bumper and/or column can be positioned such that it is not in the way of a person occupant, yet can house sensors such that the sensors field of view is not blocked by the person occupant.

Figure 2C:
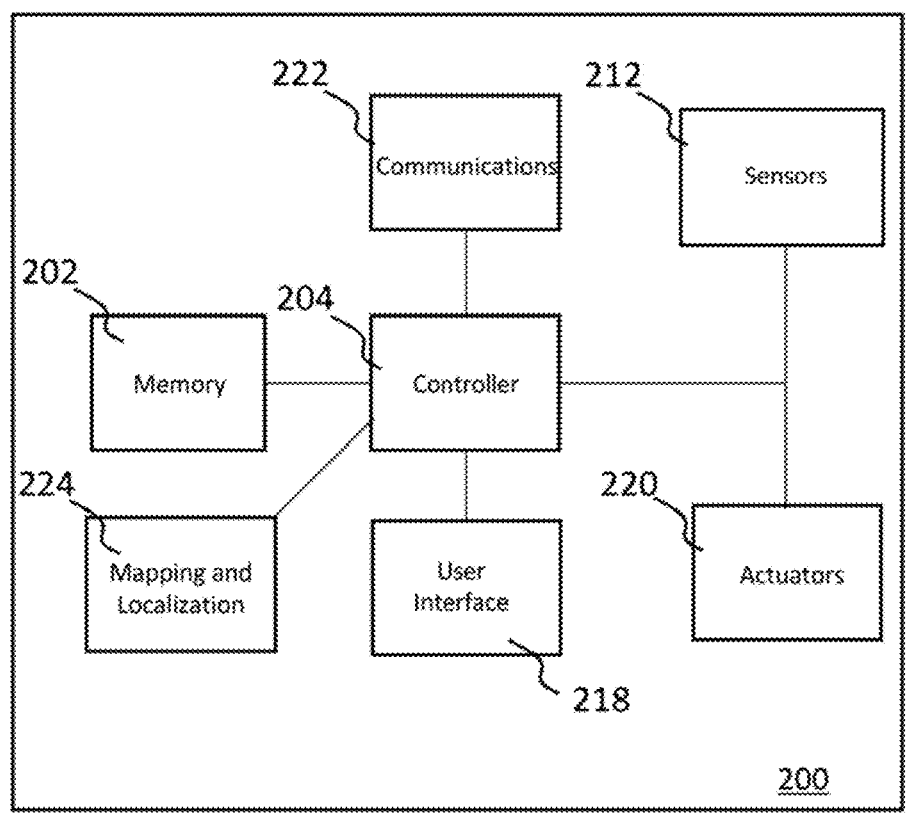
FIG. 2C is a functional block diagram of a robot in accordance with some implementations of this disclosure.

FIG. 2C is a functional block diagram of a robot 200 in accordance with some principles of this disclosure. As illustrated in FIG. 2C, robot 200 can include controller 204, memory 202, user interface unit 218, mapping and localization unit 224, sensors unit 212, actuators unit 220, and communications unit 222, as well as other components and subcomponents (e.g., some of which may not be illustrated). Although a specific implementation is illustrated in FIG. 2C, it is appreciated that the architecture can be varied in certain implementations as would be readily apparent to one of ordinary skill given the contents of the present disclosure. As used herein, robot 200 can be representative at least in part of any robot described in this disclosure.

Controller 204 can control the various operations performed by robot 200. Controller 204 can include one or more processors (e.g., microprocessors) and other peripherals. As used herein, processor, microprocessor, and/or digital processor can include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors can be contained on a single unitary integrated circuit die, or distributed across multiple components.

Controller 204 can be operatively and/or communicatively coupled to memory 202. Memory 202 can include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 202 can provide instructions and data to controller 204. For example, memory 202 can be a non-transitory, computer-readable storage apparatus and/or medium having a plurality of instructions stored thereon, the instructions being executable by a processing apparatus (e.g., controller 204) to operate robot 200. In some cases, the instructions can be configured to, when executed by the processing apparatus, cause the processing apparatus to perform the various methods, features, and/or functionality described in this disclosure. Accordingly, controller 204 can perform logical and/or arithmetic operations based on program instructions stored within memory 202. In some cases, the instructions and/or data of memory 202 can be stored in a combination of hardware, some located locally within robot 200, and some located remote from robot 200 (e.g., in a cloud, server, network, etc.).

In some implementations, sensors unit 212 can comprise systems and/or methods that can detect characteristics within and/or around robot 200. Sensors unit 212 can comprise a plurality and/or a combination of sensors. Sensors unit 212 can include sensors that are internal to robot 200 or external, and/or have components that are partially internal and/or partially external. In some cases, sensors unit 212 can include one or more exteroceptive sensors, such as sonars, light detection and ranging ("LIDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. In some implementations, sensors unit 212 can collect raw measurements (e.g., currents, voltages, resistances, gate logic, etc.) and/or transformed measurements (e.g., distances, angles, detected points in obstacles, etc.). In some cases, measurements can be aggregated and/or summarized. Sensors unit 212 can generate data based at least in part on measurements. Such data can be stored in data structures, such as matrices, arrays, queues, lists, arrays, stacks, bags, etc. In some implementations, the data structure of the sensor data can be called an image.

In some implementations, sensors unit 212 can include sensors that can measure internal characteristics of robot 200. For example, sensors unit 212 can measure temperature, power levels, statuses, and/or any characteristic of robot 200. In some cases, sensors unit 212 can be configured to determine the odometry of robot 200. For example, sensors unit 212 can include proprioceptive sensors, which can comprise sensors such as accelerometers, inertial measurement units ("IMU"), odometers, gyroscopes, speedometers, cameras (e.g. using visual odometry), clock/timer, and the like. Odometry can facilitate autonomous navigation and/or autonomous actions of robot 200. This odometry can include robot 200's position (e.g., where position can include robot's location, displacement and/or orientation, and can sometimes be interchangeable with the term pose as used herein) relative to the initial location. Such data can be stored in data structures, such as matrices, arrays, queues, lists, arrays, stacks, bags, etc. In some implementations, the data structure of the sensor data can be called an image.

Mapping and localization unit 224 can receive sensor data from sensors unit 212 to localize robot 200 in a map. In some implementations, mapping and localization unit 224 can include localization systems and methods that allow robot 200 to localize itself in the coordinates of a map and/or relative to a location (e.g., an initialization location, end location, beacon, reference point, etc.). Mapping and localization unit 224 can also process measurements taken by robot 200, such as by generating a graph and/or map. In some implementations, mapping and localization unit 224 may not be a separate unit, but rather a portion of sensors unit 212 and/or controller 204.

In some implementations, robot 200 can map and learn routes through a learning process. For example, an operator can teach robot 200 where to travel in an environment by driving robot 200 along a route in an environment. Through a combination of sensor data from sensor units 212, robot 200 can determine robot 200's relative poses and the poses of items in the environment. In this way, robot 200 can determine where it is in an environment and where it has travelled. Robot 200 can later recall where it travelled and travel in a substantially similar way (though it may avoid certain obstacles in subsequent travels). Robots can share such experiences with each other, such as through network 302 (which will be described with reference to FIG. 3).

In some implementations, user interface unit 218 can be configured to enable a user to interact with robot 200. For example, user interface unit 218 can include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users can interact through voice commands or gestures. User interface units 218 can include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. In some implementations user interface unit 218 can be positioned on the body of robot 200. In some implementations, user interface unit 218 can be positioned away from the body of robot 200, but can be communicatively coupled to robot 200 (e.g., via communication units including transmitters, receivers, and/or transceivers) directly or indirectly (e.g., through a network, server, and/or a cloud). In some implementations, user interface unit 218 can include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information can utilize arrows, colors, symbols, etc.

By way of illustration, robot 200 can have a projector, lights, and/or other projection systems. Robot 200 can project an image on the floor to let people know the direction of movements and/or the next action. For example, robot 200 can project an image of a path onto the floor to let people know where it will be traveling. Other images projected on the floor may indicate to people where robot 200 plans to stop, when it plans to start moving, where it moves, and/or useful information to make people around the robotic chair feel more comfortable and safe. Such projections can utilize substantially similar systems and methods as U.S. Patent Publication No. 2016/0375592, entitled "APPARATUS AND METHODS FOR SAFE NAVIGATION OF ROBOTIC DEVICES," which is hereby incorporated herein by reference in its entirety.

In some implementations, communications unit 222 can include one or more receivers, transmitters, and/or transceivers. Communications unit 222 can be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

As used herein, network interfaces can include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc.

As used herein, Wi-Fi can include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

Communications unit 222 can also be configured to send/receive signals utilizing a transmission protocol over wired connections, such as any cable that has a signal line and ground. For example, such cables can include Ethernet cables, coaxial cables, Universal Serial Bus ("USB"), FireWire, and/or any connection known in the art. Such protocols can be used by communications unit 222 to communicate to external systems, such as computers, smart phones, tablets, data capture systems, mobile telecommunications networks, clouds, servers, or the like. Communications unit 222 can be configured to send and receive signals comprising of numbers, letters, alphanumeric characters, and/or symbols. In some cases, signals can be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 222 can be configured to send and receive statuses, commands, and other data/information. For example, communications unit 222 can communicate with a user operator to allow the user to control robot 200. Communications unit 222 can communicate with a server/network (e.g., a network) in order to allow robot 200 to send data, statuses, commands, and other communications to the server. The server can also be communicatively coupled to computer(s) and/or device(s) that can be used to monitor and/or control robot 200 remotely. Communications unit 222 can also receive updates (e.g., firmware or data updates), data, statuses, commands, and other communications from a server for robot 200.

Actuators unit 220 can include any system used for actuating, in some cases to perform tasks. For example, actuators unit 220 can include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. In some implementations, actuators unit 220 can include systems that allow movement of robot 200, such as motorize propulsion. For example, motorized propulsion can move robot 200 in a forward or backward direction, and/or be used at least in part in turning robot 200 (e.g., left, right, and/or any other direction). By way of illustration, actuators unit 220 can control if robot 200 is moving or is stopped and/or allow robot 200 to navigate from one location to another location.

Figure 3:
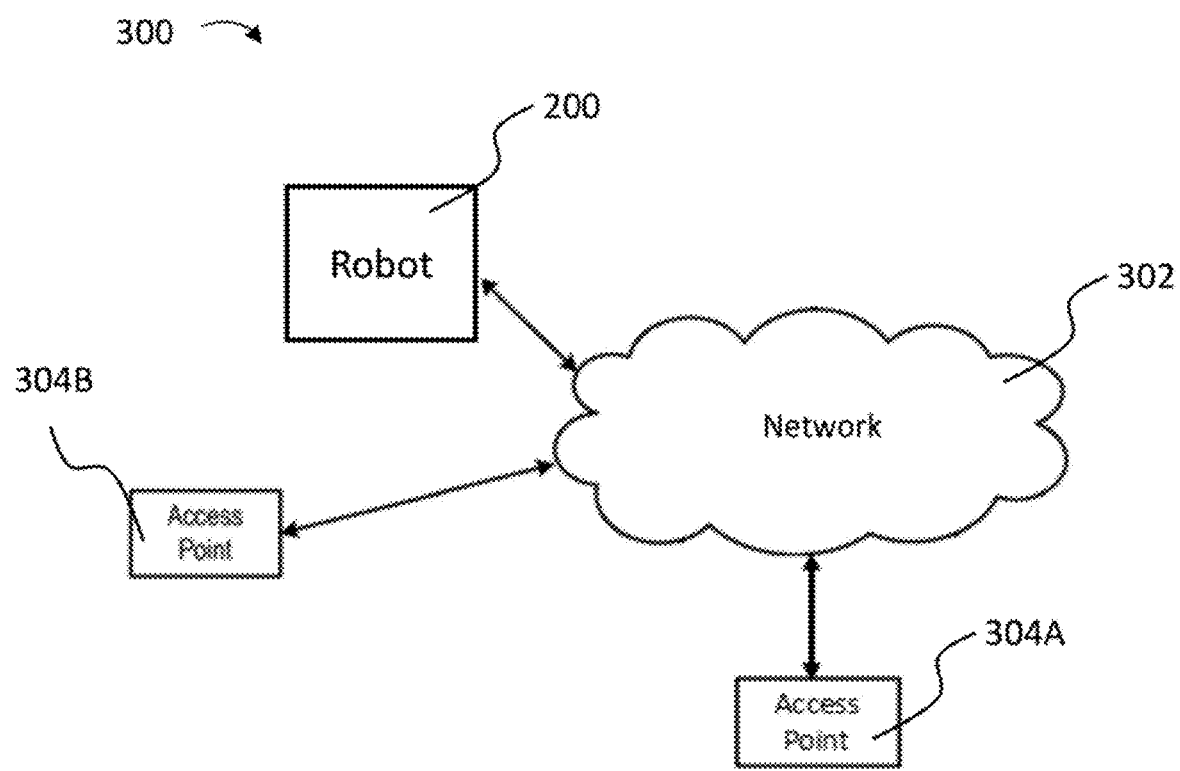
FIG. 3 is a functional block diagram of a system that includes a robot communicatively and/or operatively coupled to a network in accordance with some implementations of this disclosure.

One or more of the units described with respect to FIG. 3 (including memory 202, controller 204, sensors unit 212, user interface unit 218, actuators unit 220, communications unit 222, mapping and localization unit 224, and/or other units) can be integrated onto robot 200, such as in an integrated system. However, in some implementations, one or more of these units can be part of an attachable module. This module can be attached to an existing apparatus to automate so that it behaves as a robot. Accordingly, the features described in this disclosure with reference to robot 200 can be instantiated in a module that can be attached to an existing apparatus and/or integrated onto robot 200 in an integrated system. Moreover, in some cases, a person having ordinary skill in the art would appreciate from the contents of this disclosure that at least a portion of the features described in this disclosure can also be run remotely, such as in a cloud, network, and/or server.

In some implementations, robot 200 can be communicatively coupled to a network. FIG. 3 is a functional block diagram of system 300, which includes robot 200 communicatively and/or operatively coupled to network 302 in accordance with some implementations of this disclosure. Network 302 can comprise a collection of hardware, software, services, and/or resources that can be invoked to instantiate a virtual machine, process, or other resource for a limited or defined duration, or an unlimited or undefined duration. Network 302 can be communicatively and/or operatively coupled to a plurality of devices, systems, and/or servers, including devices and/or servers that have access to the internet. One or more of access points, such as access points 304A and 304B, can be devices, systems, and/or servers, including, but not limited to, computers, mobile devices, tablets, smart phones, cells phones, personal digital assistants, phablets, e-readers, smart watches, set-top boxes, internet streaming devices, gaming consoles, smart appliances, and/or any device with access to the internet and/or any network protocol. Although two access points are illustrated, there can be more or fewer access points as desired.

As used herein, network 302 can be operated: network 302 can have onboard computers that can receive, process, and/or send information. These computers can operate autonomously and/or under control by one or more human operators. Similarly, network 302 can have access points (e.g., access points 304A and 304B), which can similarly be used to operate network 302. The access points can have computers and/or human operators that can receive, process, and/or send information. Accordingly, references herein to operation of network 302 can be applied to a human operator and/or a computer operator.

In some implementations, one or more robots that are substantially similar to robot 200 can be communicatively and/or operatively coupled to network 302. Each of these robots can communicates statuses, commands, and/or operative data to network 302. Network 302 can also store and/or communicate statuses, commands, and/or operative data to these one or more of robots. In some cases, network 302 can store maps, sensor data, and other information from robot 200 and/or other robots. Network 302 can then share experiences of a plurality of connected robots to each other. Moreover, with the aggregation of information, network 302 can performed machine learning algorithms to improve performance of the robots.

A person having ordinary skill in the art would appreciate from the contents of this disclosure that some portions of this disclosure may be performed by robot 200, network 302, and/or access points 304A and/or 304B. Though certain examples may be described with reference to one or more of robot 200, network 302, and/or access points 304A and/or 304B, it would be appreciated that the features of the examples can be distributed amongst robot 200, network 302, and/or access points 304A and/or 304B to achieve substantially similar results.

Figure 4:
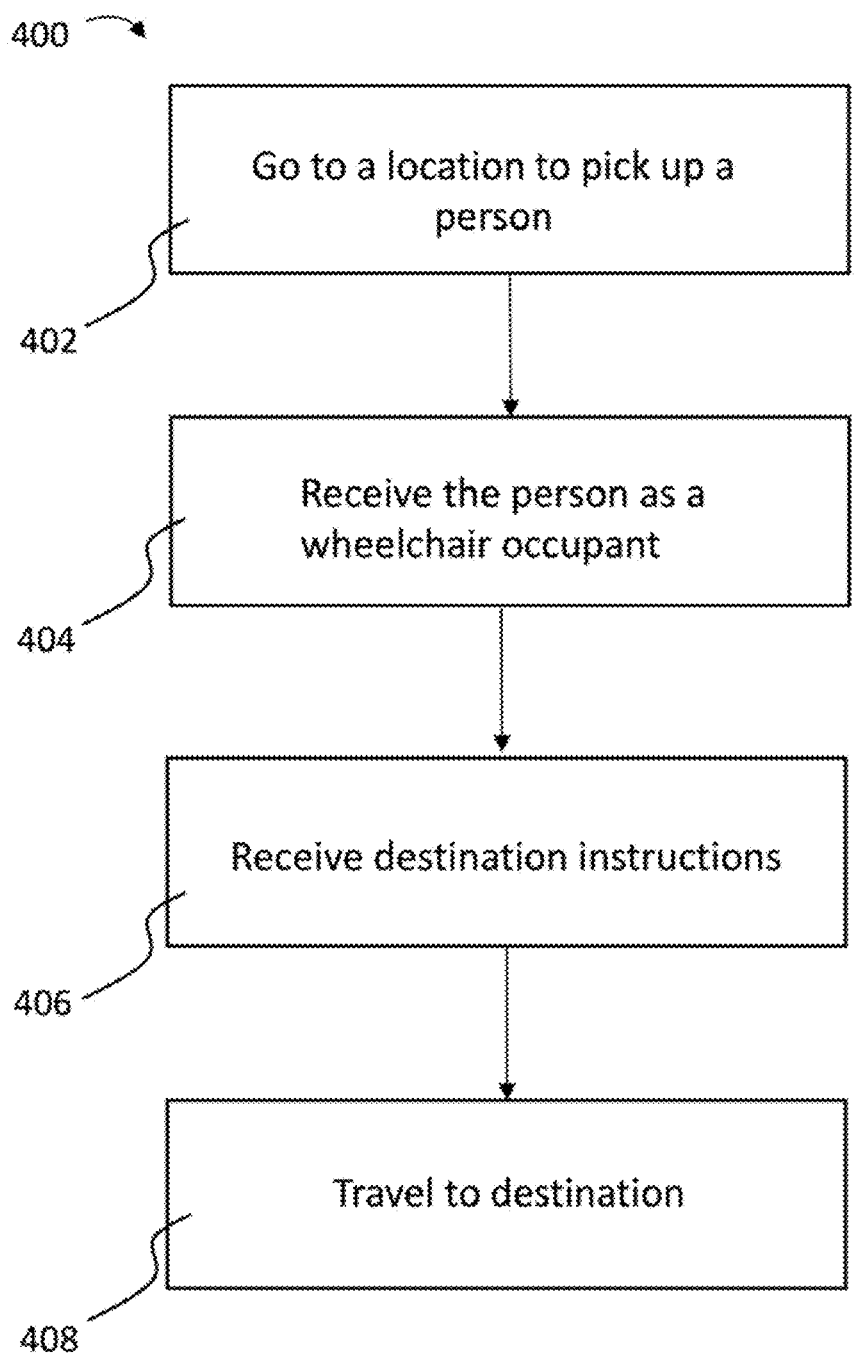
FIG. 4 is a process flow diagram of an exemplary method for operating a robotic wheelchair in accordance with some implementations of this disclosure.

FIG. 4 is a process flow diagram of an exemplary method 400 for operating a robotic wheelchair in accordance with some implementations of this disclosure. While this example describes robotics in the context of a wheelchair, a person having ordinary skill in the art would appreciate that method 400 can be readily applied to other robotics given the contents of this disclosure, including applications to mobile platforms that transport people, items, animals, etc.

Block 402 includes going to a location to pick up a person. For example, robot 200 can go to a centralized location where people waiting for wheelchairs congregate, such as a pick-up station, entrance, exit, designated pick-up location, and/or any other place that can be predetermined. As another example, robot 200 can go to a particular location in order to wait or pick up one or more persons.

Figure 5A:
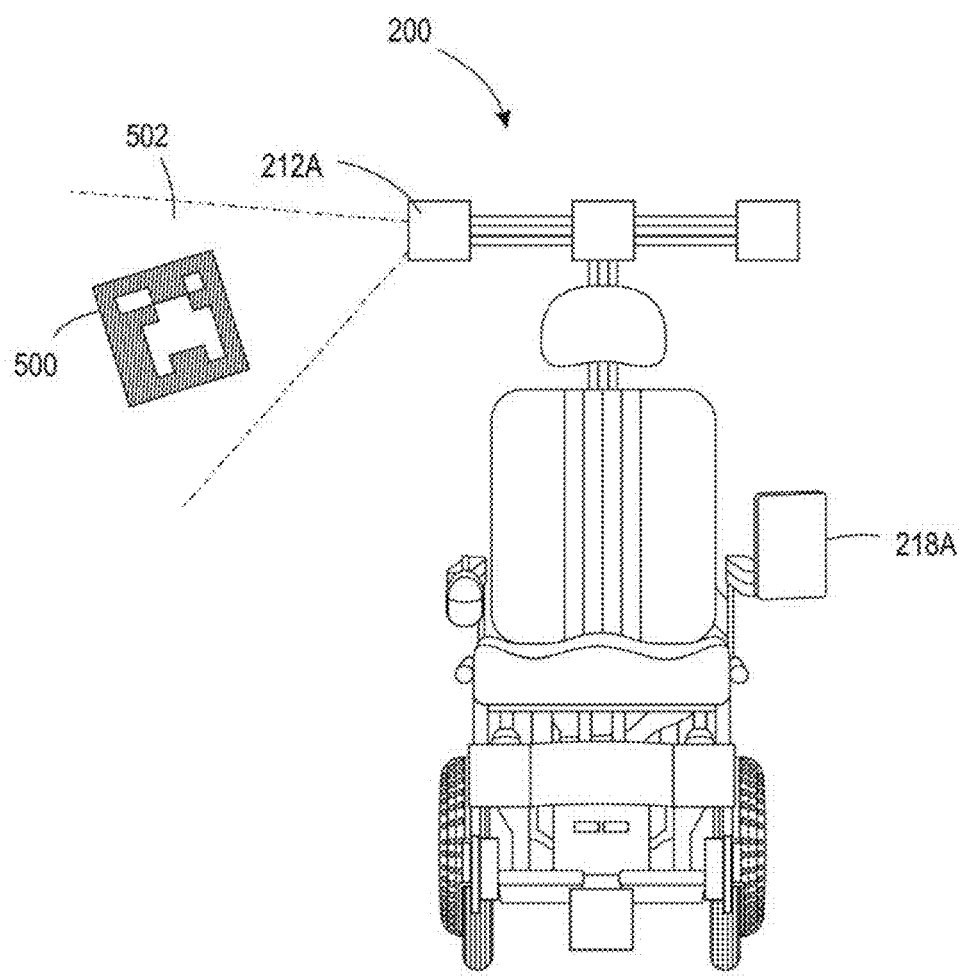
FIG. 5A is a front view of a robot detecting a marker in accordance with some implementations of this disclosure.

In some implementations, robot 200 can determine it is at a pick-up location based at least in part on the detection of a marker. For example, FIG. 5A is a front view of robot 200 detecting marker 500 in accordance to some implementations of this disclosure. Marker 500 can also include tangible objects, such as chairs, columns, ornaments, etc. Marker 500 can include human-readable symbols, such as text. For example, the text can describe characteristics of the marker 500 such as the location, an alphanumeric associated with the location (e.g., including locations 1, 2, 3, 4, locations A, B, C, D, locations 1A, 1B, 1C, etc.), a description of the destinations associated at least in part with marker 500 (e.g., if such destinations are limited), and/or any characteristic and/or aspect of marker 500. In some implementations, marker 500 can be displayed on a screen. For example, the screen can include a display, such as, without limitation, LCDs, LED displays, LED LCD displays, IPS displays, cathode ray tubes, plasma displays, HD panels, 4K displays, retina displays, organic LED displays, touchscreens, surfaces, canvases, screen ink technology, and/or any displays, televisions, monitors, panels, and/or devices known in the art for visual presentation. Advantageously, a screen can display an image that can be changed. In each instance, marker 500 can be an object that robot 200 can recognize through one or more of sensors unit 212, such as sensor 212A.

In some implementations, where marker 500 is an image, marker 500 can be instantiated in the visible spectrum (e.g., visible by a human), as with the case where sensor 212A is an RGB camera or it can be instantiated outside of the visible spectrum (e.g., not visible by humans), where sensor 212A can detect marker 500 using infrared cameras, hyperspectral cameras, and/or other cameras and/or sensors that can image or detect energy outside of the visible spectrum.

In some implementations, marker 500 can transmit a signal, such as a radio transmission (e.g., BLUETOOTH®) and/or other signal protocol to enable detection of marker 500 by robot 200. In some implementations, there can be a transmitter (e.g., a transmitter that transmits communications using RFID, NFC, BLUETOOTH®, radio transmission, radio frequency field, and/or any other communication protocol described in this disclosure) at, or substantially close to, the pick-up location. Such communications can also transmit information about the pick-up location, such as its passengers, coordinates, identification, etc. When robot 200 detects that it is on top of, and/or substantially close to, the transmitter, robot 200 can detect that robot 200 is at the pick-up location. In some cases, the transmitter can have an operable range such that robot 200 can detect a communication from the transmitter only when it is in the starting location. By way of illustrative example, the transmission range of NFC can be ten centimeters or less. Accordingly, when robot 200 receives a transmission via NFC, robot 200 can detect that it is positioned at the pick-up location. In some implementations, robot 200 can receive the transmission from the transmitter and calculate the distance to the transmitter based at least in part on the attenuation of the signal strength. In this way, robot 200 can detect how close it is to the transmitter, and consequently, the position of robot 200 relative to the transmitter and/or the pick-up location. In some implementations, robot 200 can determine its location by triangulating the signal strength of a plurality of transmitters. In some implementations, the pick-up location can be demarcated by a sign (e.g., markings, symbols, lines, etc.) on the floor. When one or more sensors of robot 200 (e.g., of sensor units 212) detect the sign on the floor, robot 200 can detect that robot 200 is positioned at the pick-up location.

In some implementations, marker 500 can make a sound, such as a chirp, beep, noise, and/or any other sound (whether audible or inaudible to humans, animals, and/or other listeners). In some cases, the sound can be unique to the marker 500, wherein other markers can make other sounds. The sounds can be detected by a sensor of sensors unit 212 (e.g., by a microphone), which can use the sound to identify and/or triangulate the location of marker 500. In some implementations, marker 500 can include both human visible and invisible elements. Advantageously, having both human visible and invisible elements can facilitate a user directing robot 200 to detect marker 500. In some cases, the visible portion can be smaller and/or more inconspicuous than the invisible portion. As illustrated, sensor 212A can be positioned at a from the ground and/or at a predetermined angle, where the height and/or angle can be determined at least in part on the expected position of marker 500 and/or where sensor 212A can be in order to capture marker 500 within field of view 502.

In some implementations, an external sensor can detect when robot 200 is at the pick-up location. The external sensor can be communicatively coupled to robot 200 and/or network 302, communicating that robot 200 is at the pick-up location. By way of illustration, the external sensor can be a camera that sees robot 200 at the pick-up location. In some implementations, the external sensor can have other functionality than just detecting robot 200, such as acting as a security camera or in the Internet of Things ("IOT") of a smart building. For example, the camera can also be used to control lighting, temperature, count people, look for congestion (e.g., of people, animals, robots, vehicles, etc.), and/or any functionality desired.

Returning to method 400 of FIG. 4, Block 404 includes receiving the person as a wheelchair occupant. For example, the person can sit in chair 206 of robot 200. In some cases, the person can sit in robot 200 under his/her own power. In some cases, the person may use assistance from a person, robot, and/or apparatus to be able to sit in robot 200.

In some implementations, robot 200 can be waiting at a pick-up location when the user arrives. In other implementations, robot 200 can be hailed in, which in some cases can be done simultaneously with block 406 (e.g., using systems and methods described with reference to FIGS. 5B-5F). In some implementations, the hailing process for robot 200 can be substantially similar to the hailing process of UBER™, LYFT™, and other taxi-hailing services where a user sends a communication (e.g., through a program application) for a ride.

Block 406 includes receiving destination instructions. For example, a user and/or operator can input the destination of robot 200 through robot 200 (e.g., user interface unit 218), through a console communicatively coupled to robot 200 and/or network 302 and/or any input mechanism.

Figure 5B:
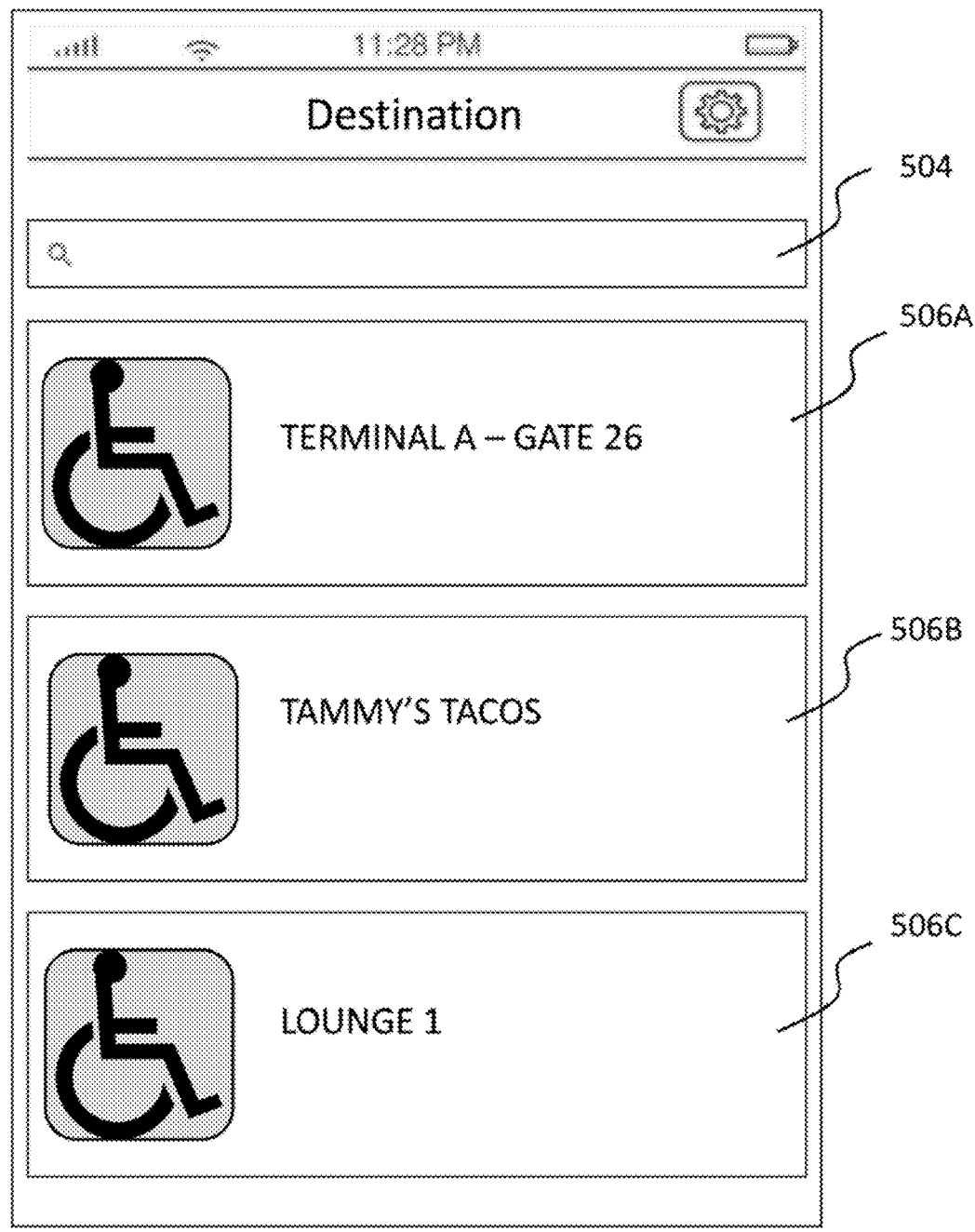
FIG. 5B is a display for inputting a destination in accordance with some implementations of this disclosure.

For example, FIG. 5B is a display 508 for inputting a destination in accordance to some implementations of this disclosure. Display 508 can be implemented on user interface unit 218 and/or an external display of robot 200 (e.g., a console).

Display 508 can include a search bar 504, where a user can input a destination. Display 508 can also display selectable locations, such as locations selectable by panels 506A-506C. The selectable locations can be populated based at least in part on available options for robot 200 to travel. In some cases, the selectable locations can be prioritized (e.g., ordered and/or displayed) based at least in part on likely locations to which a user would travel. In some cases, a user and/or operator can type in the location (e.g., by name, coordinates (relative and/or universal)), and/or select the destination on a map shown on display 508.

Figure 5C:
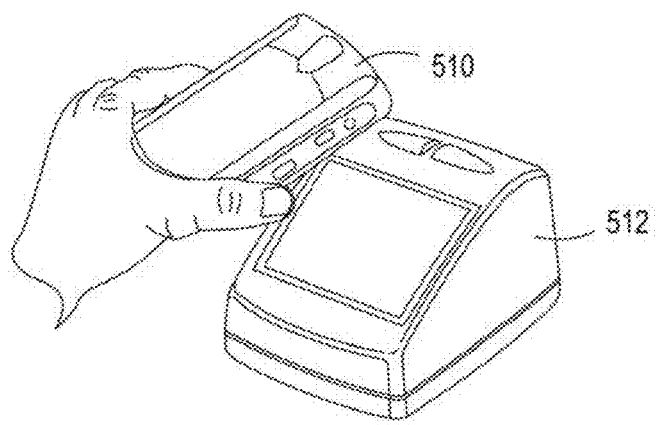
FIG. 5C is an angled side view of a console that can be used for a user to input a destination and/or call a robot in accordance with some implementations of this disclosure.

As another example, FIG. 5C is a side angled view of a console that can be used for a user to input a destination and/or call a robot 200 in accordance with some implementations of this disclosure. Console 512 can be a scanner configured to scan, for example, barcodes and/or information on paper, electronic devices, and/or other modalities for passing information.

In some implementations, console 512 can be connected (e.g., wired and/or wireless) as an access point to network 302, sending and/or receiving information from network 302. In some implementations, network 302 can contain information on a plurality of robots (e.g., robot 200) and a plurality of locations to which the robots can travel. Accordingly, network 302 can process information from console 512 (e.g., sent by a communication protocol from console 512 to network 302) into instructions for robot 200 on where to travel. Network 302 can then transfer such instructions to robot 200 via a communication protocol (e.g., via communications unit 222).

Electronic device 510 can comprise one or more personal computers ("PCs") and/or minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions. A user and/or operator can utilize electronic device 510 to communicate with console 512, such as through scanning, wired and/or wireless data transfer (e.g., using RFID, NFC, BLUETOOTH®, radio transmission, radio frequency field, and/or any other communication protocol), sound, and/or any other input mechanism.

Figure 5D:
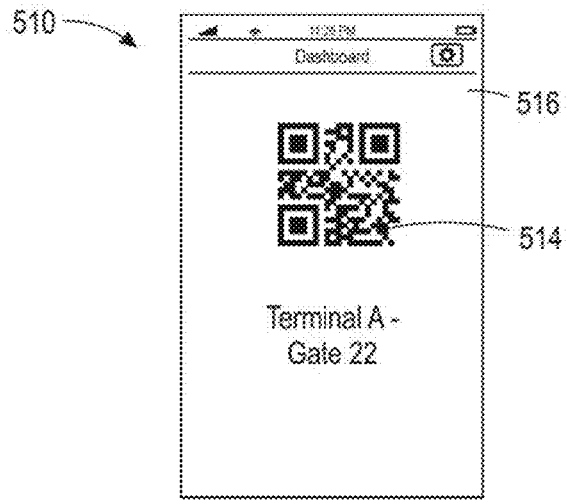
FIG. 5D is a display of an electronic device in accordance with some implementations of this disclosure.

By way of illustration, FIG. 5D is a display 516 of electronic device 510 in accordance to some implementations of this disclosure. Display 516 includes scannable marker 514, which when scanned by console 512, can convey information to console 512 regarding, for example, a destination for robot 200, the need for robot 200 to travel to a pick-up location, the location of a passenger/user, and/or any other information relevant for the user.

In some implementations, electronic device 510 can run an application, such as an application available for download through APPLE INC.'s, AMAZON's, and/or GOOGLE's App Stores. The application can allow a user to hail a robotic wheelchair, make payments for the wheelchair, select destinations, see wheelchair wait time, and/or any statuses and/or tasks that may be of interest.

Figure 5E:
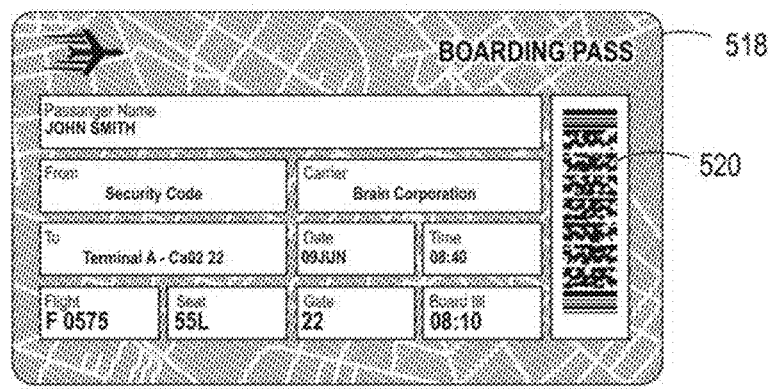
FIG. 5E is a scannable pass in accordance with some implementations of this disclosure.

As another example, FIG. 5E is a scannable pass 518 in accordance to some implementations of this disclosure. Pass 518 can be issued at a ticket counter, printed (e.g., at a console such as console 512) or other interface, accessible through a personal computer or minicomputer, and/or otherwise produced. Pass 518 can comprise barcode 520, which can convey information to console 512 regarding, for example, a destination for robot 200, the desire for robot 200 to travel to a pick-up location, the location of a passenger/user, and/or any information relevant for the user.

Figure 5F:
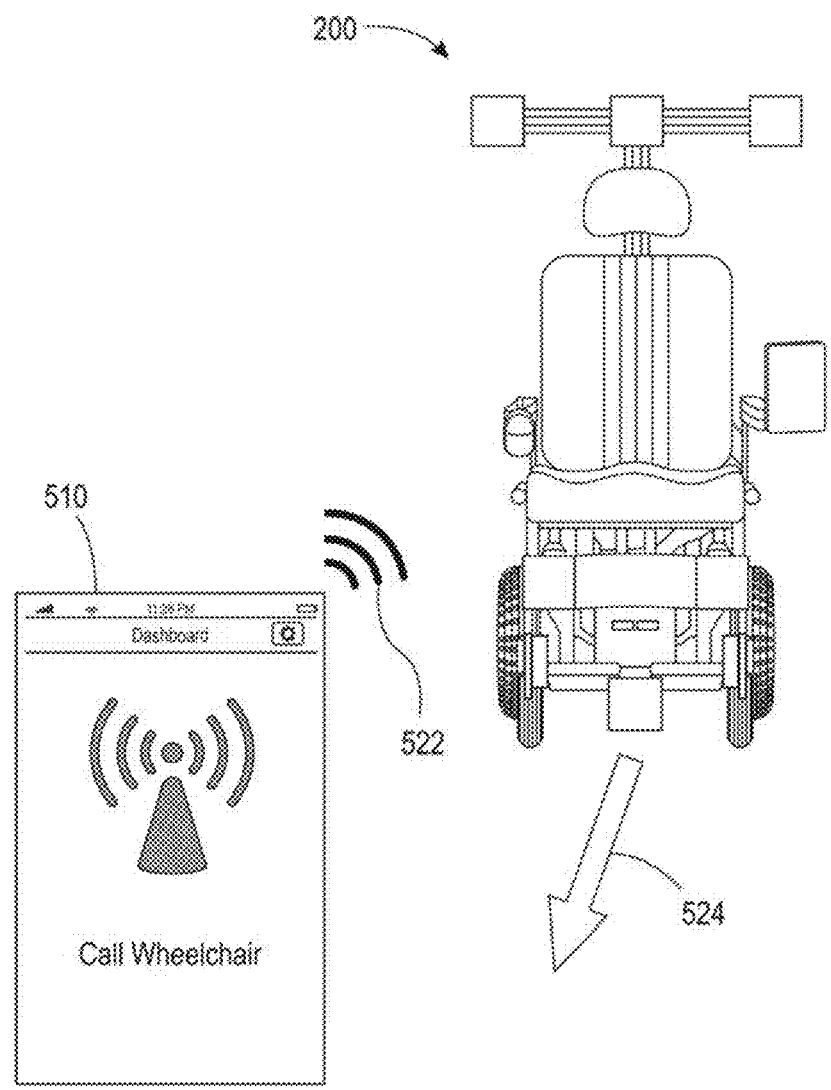
FIG. 5F is a system that includes an electronic device in communication with a robot in accordance with some implementations of this disclosure.

As another example, FIG. 5F includes an electronic device 510 connecting with robot 200 in accordance to some implementations of this disclosure. Electronic device 510 can connect directly to robot 200 and/or network 302. Electronic device 510 can communicate to robot 200 and/or network 302 through signal(s) 522, which can comprise wired and/or wireless data transfer (e.g., using RFID, NFC, BLUETOOTH®, radio transmission, radio frequency field, and/or any other communication protocol), sound, and/or any other input mechanism. In response to the communication, robot 200 can move to a location, as illustrated by example trajectory 524 showing that robot 200 moves towards electronic device 510 (other locations can also be designated).

In some implementations, electronic device 510 can hail robot 200 by acting as a beacon. For example, electronic device can emit a signal (e.g., using RFID, NFC, BLUETOOTH®, radio transmission, radio frequency field, and/or any other communication protocol), sound, and/or any other signal that can be detected by robot 200. Robot 200 can be configured to go to the source of that emitted signal, which is where electronic device 510 and/or a passenger can be located.

In some implementations, electronic device 510 can send other information to robot 200 regarding where to pick-up and/or go as a destination. For example, electronic device 510 can send coordinates (e.g., global positioning system ("GPS") coordinates, relative or universal coordinates), location names, marker destinations, and/or any other identification information as a pick-up and/or destination location for robot 200.

Returning to FIG. 4, block 408 can then include travelling to the destination. In some implementations, robot 200 can determine that it has arrived at the destination location based at least in part to substantially similar systems and methods as described with respect to block 402 and/or FIGS. 5A-5F.

In some implementations, after arriving at the destination, robot 200 can stay at the destination to pick up another passenger. In some implementations, robot 200 can move to other locations, such as: a maintenance area to receive maintenance, a storage location, a location where passengers aggregate (e.g., the entrance of an environment, passenger stop, and/or designated area), a place where there are other robots, a place where there are fewer robots (e.g., in order to increase the area coverage of robots), no particular location (e.g., wandering to pick up an occupant that hails it), and/or any designated location and/or pattern of movement.

In some implementations, there can be a plurality of robots acting in coordination. For example, some environments (e.g., shopping malls, hospitals, retirement communities, airports, office buildings, city centers, schools, and/or other public or private places) can have a plurality of people and/or robots in a space. In some cases, for example, the plurality of robots can be coordinated and/or connected to one or more networks substantially similar to network 302. For example, network 302 can manage the locations of one or more of robot 200 and/or other robots. In some cases, network 302 can act as traffic control, controlling the locational density, trajectories, avoidance of collisions, flow, and/or other characteristics of the aggregated set of robots to which network 302 is in communication. For example, network 302 can assist the robots in travelling in an ordered manner, assure that the robots travel in optimal routes, that robots distribute themselves in locations where they can quickly/effective serve passengers (e.g., can arrive at pick-up places quickly), behave safely, avoid collisions, move out of the way of emergency vehicles, and/or other macro-level and/or micro-level management.

In order to aide such coordination, a plurality of robots can be communicatively coupled to one another. For example, using communications unit 222, robot 200 can send signals to one or more other robots indicating one or more of robot 200's location, speed, acceleration, stopping/breaking, status (e.g., on, off, good status, bad status, failures, errors, need assistance), destination, etc. In one implementation, the robots communicate through a common hub, e.g., in the cloud. In some cases, robots can communicate with each other, and/or use each other as relays for information, in the event that network 302 is not fully functional. For example, robots can communicate via a distributive network, mobile ad hoc network ("MANET"), and/or any connective network. Any communication and/or signal described in this disclosure can then be transmitted through such network.

Figure 6A:
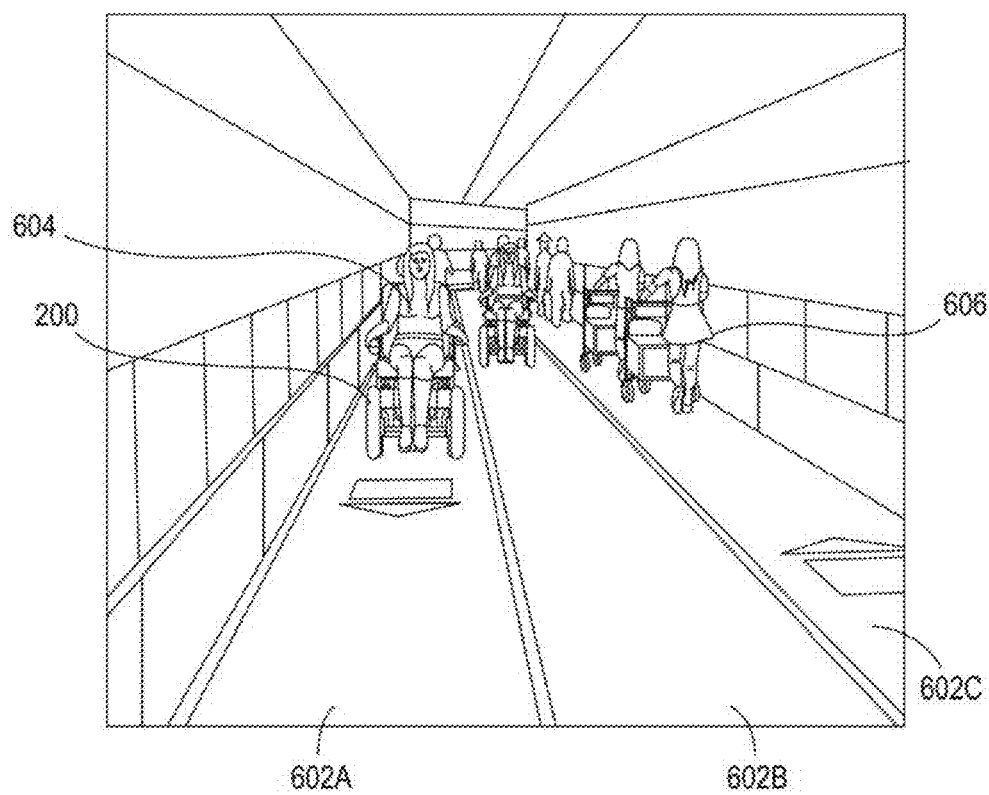
FIG. 6A is an elevated front view of a corridor in which a robot travels in accordance with some implementations of this disclosure.

In some cases, the environment in which robot 200 operates can be adjusted to more efficiently and/or effectively accommodate robot 200 and/or other robots. For example, FIG. 6A is an elevated front view of a corridor in which robot 200 travels in accordance to some implementations of this disclosure. Person 604 can be a passenger on robot 200 to move from one location to another. In this illustration, robot 200 is a robotic wheelchair, but other apparatuses (such as other apparatuses described in this disclosure) are also envisioned.

In some environments, there can be lane 602A, which can have one or more designated characteristics. For example, lane 602A can be of a direction, a travel type (e.g., wheelchair only, walking only, carts only, luggage only, vehicles only, robots only, etc.), speed (slow, medium, fast, a predetermined speed, etc.), and/or any other predetermined characteristic. Advantageously, where lane 602A is a robotic wheelchair-only lane, robotic wheelchairs can operate more efficiently. There can be other lanes with other characteristics. By way of illustration, lane 602B can be a passing lane, where people, robots, and/or any other mobile entity in the area can pass entities in lane 602A. There can be other lanes as well, such as lane 602C, which can have a different characteristic. For example, person 606 is walking with a cart in lane 602C. By way of illustration, lane 602C can be designated for carts and pedestrians in a direction.

In some implementations, robot 200 can implement object and/or people recognition. As used in this example, people can also be interchanged with animals where animals are desired to be detected. Advantageously, detecting people can allow robot 200 to be safer around people and/or be able to detect where passengers (and/or potential passengers) are located. In some cases, an object and/or person can be identified by robot 200, such as by detecting characteristics of the object and/or person, and/or matching the data from the sensor of sensors unit 212 to identified objects and/or people in a library of sensor data. In some cases, robot 200 may not specifically identify an object and/or person, but rather just detect the presence of an object and/or person. In some cases, robot 200 can recognize certain characteristics of a person, such as the presence of a face, limbs, gait, movement pattern, heat, and/or any differentiating characteristics between people and objects.

In some cases, memory 202 can store a library of sensor data. In some cases, the sensor data can be associated at least in part with objects and/or people. In some implementations, this library can include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library can be taken by a sensor (e.g., a sensor of sensors unit 212 or any other sensor) and/or generated automatically, such as with a computer program that is configured to generate/simulate (e.g., in a virtual world) library sensor data (e.g., which can generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library can depend at least in part on one or more of the amount of available data, the variability of the surrounding environment in which robot 200 operates, the complexity of objects and/or people, the variability in appearance of objects, physical properties of robots, the characteristics of the sensors, and/or the amount of available storage space (e.g., in the library, memory 202, and/or local or remote storage). In some implementations, at least a portion of the library may be stored on a network (e.g., cloud, server, distributed network, etc.) and/or may not be stored completely within memory 202. As yet another example, various robots (e.g., that are commonly associated, such as robots by a common manufacturer, user, network, etc.) can be networked so that data captured by individual robots are collectively shared with other robots. In such a fashion, these robots can be configured to learn and/or share sensor data in order to facilitate the ability to readily detect and/or identify errors and/or assist events.

In some implementations, robot 200 can be configured to slow down and/or stop around people and/or objects. Such an action can allow additional safety for the occupant of robot 200, if any, and people in the environment. In some implementations, robot 200 can be configured to turn and/or swerve around people and/or objects so as to avoid collisions and/or not be obstructed.

Figure 6B:
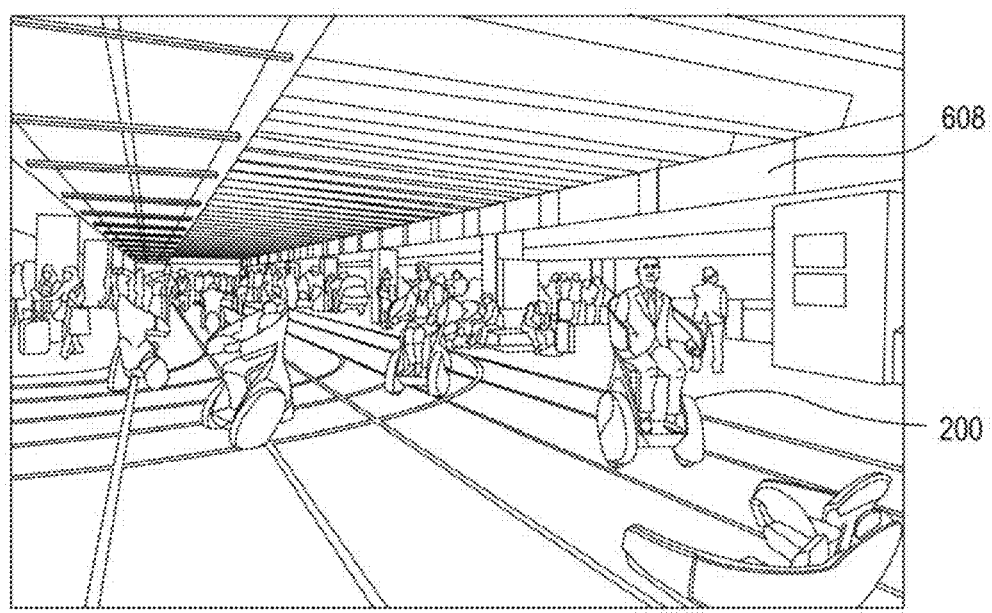
FIG. 6B is an elevated front view of robots utilizing lanes in a large environment in accordance with some implementations of the present disclosure.

FIG. 6B is a side view of robots utilizing lanes in a large environment in accordance with some implementations of the present disclosure. A public space can have a plurality of lanes going in a plurality of directions as desired. Robot 200 and other robots can use those lanes for guidance. The lanes can converge, diverge, and/or go in any desired pattern. In some cases, destinations, such as destination 608, can be in proximity to the lanes such that robot 200 can travel along the lanes to arrive at destination 608.

In some implementations, robot 200 can be equipped with a camera and/or sensor that can detect occupants and their actions. For example, the camera or other sensor can be positioned such that the field of view of such camera and/or sensor includes the occupant. Accordingly, in some implementations, robot 200 can stop when occupants try to stand up, protrude their limbs outside robot 200, and/or do any action that may result in unsafe operation of the robot 200, injury to the occupant, collision with obstacles or other people, and/or indicate at least in part that a person is getting out of robot 200.

In some implementations, the camera and/or sensor can detect objects left in robot 200. For example, the camera and/or sensor can detect objects left when the occupant leaves the chair, thereby preventing loss of personal property.

The camera and/or sensor can detect gestures that control operation of robot 200. For example, such gestures can be predetermined, signifying, e.g., stop, left turn, right turn, reverse, and/or any other instruction. In some implementations, the gestures can instruct macro instructions, combining strings of more basic instructions.

In some implementations, robot 200 can have a microphone and detect voice commands of the occupant. For example, such voice commands can be predetermined, signifying, e.g., stop, left turn, right turn, reverse, and/or any other instruction. In some implementations, the gestures can instruct macro instructions, combining strings of more basic instructions.

In some implementations, the microphone can allow an occupant to have a conversation with an operator and/or ask for assistance. If requested, the operator can provide directions, instructions, and/or other commands to robot 200, and/or control the motion of robot 200 remotely.

In some implementations, when the occupant leaves robot 200, at least one sensor of robot 200 can detect the new location and pose of the occupant so that the robot 200 can move away autonomously or continue to stay in the current position and wait for further actions or instructions. For example, the occupant may want to stand up temporarily for a short period of time with the intention to sit back in robot 200. In some implementations, robot 200 does not move if the occupant stands in front of robot 200, such as when robot 200 detects the occupant standing with the at least one camera.

In some implementations, robot 200 will not move if the occupant makes a gesture. For example, the gesture can be determined, indicating at least in part to robot 200 that robot 200 should not move. By way of illustration, the person can hold his/her hand in a manner directed toward robot 200, as if holding robot 200 on a leash. In some implementations, robot 200 will move after a brief period of time unless a button is pressed to hold it in place. The button can be a physical button on the machine and/or a digital button displayed on a user interface of user interface unit 218.

Through touchscreen interface, voice command, and/or user interface unit 218, occupants of robot 200 can indicate that they would like to make a stop in the middle of their route. Advantageously, stopping can allow the occupant to move around, stretch, use the restroom, shop, talk to someone, and/or perform any activity desired. In some cases, robot 200 can allow the occupant to leave temporarily, and/or wait for the occupant at the location where the occupant left robot 200 and/or at a new location designated by the occupant (e.g., such as by communication through user interface unit 218).

In some implementations, people can hail robot 200 using electronic devices, such as mobile phones. In addition, robot 200 can have one or more cameras and/or sensors that can detect people hailing robot 200 using gestures. In some cases, the gestures can be predetermined, such as gestures indicative of the desire for a ride. For example, these gestures can include pointing to robot 200 and/or using other customary gestures as if hailing a taxi or hitchhiking a ride.

In some implementations, a plurality of robots can operate in tandem, e.g., near each other when they transport a family or a group of two or more people. In some cases, if one robot is stalled, e.g., due to obstacles and/or actions of the occupant, the other robot(s) in the tandem can pause to wait for the stalled robot, even though they may have no obstructions and/or are free to move forward. The communication between such robots in tandem can occur through communications units substantially similar to communications unit 222. For example, such communications can occur directly through local wireless links, through a central hub and/or a server, and/or by means of visual perception (e.g., lights, symbols, movements, etc.) through forward and backward facing cameras.

As used herein, computer and/or computing device can include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, computer program and/or software can include any sequence or human or machine cognizable steps which perform a function. Such computer program and/or software can be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link can include a causal link between any two or more entities (whether physical or logical/virtual), which enables information exchange between the entities.

It will be recognized that while certain aspects of the disclosure are described in terms of a specific sequence of steps of a method, these descriptions are only illustrative of the broader methods of the disclosure, and can be modified as required by the particular application. Certain steps can be rendered unnecessary or optional under certain circumstances. Additionally, certain steps or functionality can be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated can be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations can be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that can be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A system for enabling autonomous navigation of a mobile platform, the system comprising:
a memory comprising computer readable instructions stored thereon; and
at least one processing device configurable to execute the computer readable instructions to:
receive a first set of coordinates corresponding to a first location of a user from an electronic device communicatively coupled to the at least one processing device;
determine a different second location for the mobile platform based on detecting at least one marker in an environment of the mobile platform, the at least one marker configurable to convey information upon being detected by the mobile platform, the detection of the at least one marker corresponding to an initial location of the mobile platform in the environment, the mobile platform corresponding to a wheelchair;
navigate the mobile platform from the second location to the first location;
receive a different second set of coordinates from the user; and
maneuver the mobile platform with the user therein to the second set of coordinates received from the user, wherein the different second set of coordinates are received by the mobile platform either after the navigation of the mobile platform from the second location to the first location or the electronic device communicating the second set of coordinates prior to the navigation of the mobile platform from the second location to the first location.

2. The system of claim 1, wherein the at least one processing device is further configurable to execute the computer readable instructions to,
transmit one or more commands to one or more actuators on the mobile platform, the one or more commands configurable to enable the navigation of the mobile platform.

3. The system of claim 2, wherein the at least one processing device is further configurable to execute the computer readable instructions to,
receive a mode selection command, the mode selection command configurable to enable at least one of a first mode and a different second mode for the mobile platform, the first mode corresponding to a powered-manual mode, and the second mode corresponding to an autonomous mode.

4. The system of claim 2, wherein the at least one processing device is further configurable to execute the computer readable instructions to,
receive data from one or more sensors, the data corresponds to time of arrival of the mobile platform at the first set of coordinates.

5. The system of claim 4, wherein the data is based on visual identification of the at least one marker by the one or more sensors, the at least one marker is external to the mobile platform and within the environment of the mobile platform.

6. The system of claim 4, wherein the data is based on radio transmission of the at least one marker within the environment of the mobile platform.

7. The system of claim 2, wherein the at least one processing device is further configurable to execute the computer readable instructions to,
display a plurality of locations on a display device, the plurality of locations comprises the second set of coordinates for the user.

8. The system of claim 1, wherein the mobile platform comprises a support structure for supporting one or more sensors.

9. The system of claim 8, wherein the support structure comprises a vertical beam and a cross beam, the cross beam extending in an opposite direction from the vertical beam.

10. The system of claim 8, wherein the one or more sensors comprises at least one of proprioceptive sensors and exteroceptive sensors.

11. The system of claim 1, wherein the mobile platform is a wheelchair for assisting the user navigate to the second set of coordinates from the first location.

12. The system of claim 11, wherein the wheelchair comprises a support structure for supporting the one or more sensors, the support structure comprises a vertical beam and a cross beam, the cross beam extending in an opposing direction from the vertical beam.

13. The system of claim 1, wherein the wheelchair corresponds to an autonomous wheelchair.

14. The system of claim 1, wherein the wheelchair comprises at least one wheel and at least seat for the user.

15. The system of claim 1, wherein the mobile platform is configurable to navigate in an indoor environment, the indoor environment corresponding to at least one of shopping mall, hospital, retirement community, airport, office building, and school.

16. The system of claim 1, wherein,
the mobile platform travels from the first location to the second location without the user therein; and
the mobile platform travels to the second set of coordinates with the user therein.

17. The system of claim 1, wherein the mobile platform stops if the user leaves the mobile platform while the mobile platform is in motion.

18. The system of claim 1, wherein the at least one marker comprises text corresponding to either location or description of destinations associated with the at least one marker.

19. The system of claim 1, wherein the mobile platform is configurable to accommodate only one user therein at a respective time.

20. A non-transitory computer readable medium comprising computer readable instructions stored thereon, that when executed by at least one processing device, configure the at least one processing device to,
receive coordinates for a first set of coordinates corresponding to a first location for a passenger from an electronic device communicatively coupled to the at least one processing device;
determine a different second location for the mobile platform based on detecting at least one marker in an environment of the mobile platform, the at least one marker configurable to convey information upon being detected by the mobile platform, the detection of the at least one marker corresponding to an initial location of the mobile platform in the environment, the first mobile platform corresponding to a wheelchair;
navigate the first mobile platform between the second location and the first location;
receive destination coordinates for the passenger; and
maneuver the first mobile platform with the user therein to the destination coordinates received from the passenger, wherein the destination coordinates are received by the mobile platform either after the navigation of the mobile platform from the second location to the first location or the electronic device communicating the destination coordinates prior to the navigation of the mobile platform from the second location to the first location.

21. The non-transitory computer readable medium of claim 20, wherein the at least one processing device is further configurable to execute the computer readable instructions to,
transmit information corresponding to coordinates of the first mobile platform to at least one processing device coupled to a second mobile platform, the second mobile platform corresponds to a different wheelchair.

22. The non-transitory computer readable medium of claim 20, wherein the at least one processing device coupled to the first mobile platform is further configurable to execute the computer readable instructions to,
receive information from one or more sensors, the received information configurable to navigate the first mobile platform along a first path.

23. The non-transitory computer readable medium of claim 22, wherein the at least one processing device coupled to the first mobile platform is further configurable to execute the computer readable instructions to,
alter the first path of navigation for the first mobile platform in response to the received information from the one or more sensors.

24. The non-transitory computer readable medium of claim 23, wherein,
the received information from the one or more sensors is in relation to the passenger of the first mobile platform; and
the at least one processing device coupled to the first mobile platform is further configurable to execute the computer readable instructions to output a command based on the alteration of the first path, the command corresponds to a halt movement of the first mobile platform.

25. The non-transitory computer readable medium of claim 23, wherein,
the received information from the one or more sensors is based on one or more objects in the environment of the first mobile platform, and
the at least one processing device on the first mobile platform is further configurable to execute the computer readable instructions to output a command based on the alteration of the first path, the path corresponds to avoiding a collision with the one or more objects.

26. A method for enabling autonomous navigation of a mobile platform, the method comprising:
receiving a first set of coordinates corresponding to a first location of a user from an electronic device communicatively coupled to at least one processor;
determining a different second location for the mobile platform based on detecting at least one marker in an environment of the mobile platform, the at least one marker configured to convey information upon being detected by the mobile platform, the detection of the at least one marker corresponding to an initial location of the mobile platform in the environment, the mobile platform corresponding to a wheelchair;
navigating the mobile platform from the second location to the first location;
receiving a different second set of coordinates from the user; and
maneuvering the mobile platform with the user therein to the second set of coordinates received from the user, wherein the different second set of coordinates are received by the mobile platform either after the navigation of the mobile platform from the second location to the first location or the electronic device communicating the second set of coordinates prior to the navigation of the mobile platform from the second location to the first location.

27. The method of claim 26 further comprising:
providing one or more commands to one or more actuators on the mobile platform, the one or more commands configurable to enable the navigation of the mobile platform.

28. The method of claim 27, further comprising:
receiving data from one or more sensors, the data configurable to enable determination of arrival time at the first location for the user.

29. The method of claim 28, wherein the receiving of the data comprises identifying, by the one or more sensors, at least one marker within the environment of the mobile platform, the marker is external to the mobile platform.

30. The method of claim 26, further comprising:
issuing the second set of coordinates to the user; and
receiving of the second set of coordinates for the user comprises scanning the issued second set of coordinates.

* * * * *